United States Patent
Ko et al.

(10) Patent No.: US 12,248,947 B2
(45) Date of Patent: Mar. 11, 2025

(54) BANKING PROCESSING METHOD AND COMPUTER-READABLE STORAGE MEDIUM HAVING APPLICATION FOR BANKING PROCESSING STORED THEREIN

(71) Applicant: KAKAOBANK CORP., Gyeonggi-do (KR)

(72) Inventors: Jung Hee Ko, Gyeonggi-do (KR); Tae Ki Ha, Gyeonggi-do (KR); Yeun Su Koo, Gyeonggi-do (KR); Bo Hyun Oh, Gyeonggi-do (KR); Lee Rang Park, Gyeonggi-do (KR); Sung Jun Kim, Gyeonggi-do (KR); Ji Hong Park, Gyeonggi-do (KR); Dong Joon Lee, Gyeonggi-do (KR); Jung Min Ahn, Gyeonggi-do (KR); Geun Won Mo, Gyeonggi-do (KR); Hyeong Jin Jang, Gyeonggi-do (KR); Jun Hyuk Yun, Gyeonggi-do (KR); Hack Cheon Kim, Gyeonggi-do (KR); Eun Jung Gil, Gyeonggi-do (KR); Ji Eun Kim, Gyeonggi-do (KR); Tae Won Kim, Gyeonggi-do (KR); Seung Jin Lee, Gyeonggi-do (KR); Do Young Lee, Gyeonggi-do (KR)

(73) Assignee: KAKAOBANK CORP., Gyeonggi-do (KR)

( * ) Notice: Subject to any disclaimer, the term of this patent is extended or adjusted under 35 U.S.C. 154(b) by 318 days.

(21) Appl. No.: 17/040,234

(22) PCT Filed: Mar. 25, 2019

(86) PCT No.: PCT/KR2019/003424
§ 371 (c)(1),
(2) Date: Sep. 22, 2020

(87) PCT Pub. No.: WO2019/190132
PCT Pub. Date: Oct. 3, 2019

(65) Prior Publication Data

US 2021/0027308 A1   Jan. 28, 2021

(30) Foreign Application Priority Data

Mar. 26, 2018 (KR) .......................... 10-2018-0034690
Mar. 26, 2018 (KR) .......................... 10-2018-0034691
Mar. 27, 2018 (KR) .......................... 10-2018-0035456

(51) Int. Cl.
*G06Q 30/018* (2023.01)
*G06F 9/54* (2006.01)
(Continued)

(52) U.S. Cl.
CPC .......... *G06Q 30/0185* (2013.01); *G06F 9/54* (2013.01); *G06Q 20/108* (2013.01);
(Continued)

(58) Field of Classification Search
CPC ............. G06Q 30/0185; G06Q 20/326; G06Q 20/108; G06Q 20/3221; G06Q 20/3223;
(Continued)

(56) References Cited

U.S. PATENT DOCUMENTS 8,826,019 B2 *  9/2014  Shablygin ............... G06F 21/34
                                                     713/168
2014/0013406 A1 *  1/2014  Tremlet ................... G09C 1/00
                                                     726/5

(Continued)

FOREIGN PATENT DOCUMENTS

JP   2016029528 A  *  3/2016
JP   2016181128 A  *  10/2016

(Continued)

OTHER PUBLICATIONS

Google patents version of Cho WO 2018/084393 retrieved on Sep. 28, 2023.*

(Continued)

*Primary Examiner* — Jamie R Kucab

(74) *Attorney, Agent, or Firm* — Harness, Dickey & Pierce, P.L.C.

(57) ABSTRACT

A banking processing method according is performed by a processing logic including an application for banking processing implemented on a user terminal and a computer-readable storage medium. The method comprises the steps of: when the application for banking processing is run, searching a hardware security area of the user terminal and confirming the existence of a certificate for confirming an execution history of the application for banking processing; when the existence of the certificate is confirmed, searching the security area and confirming the existence of a token key for identifying whether login information of the user has been set; when the existence of the token key is not confirmed, setting the login information of the user by providing a membership page for setting the login information of the user; and opening an account according to a request of the user whose login information has been set.

13 Claims, 18 Drawing Sheets

(51) Int. Cl.
| | | |
|---|---|---|
| *G06Q 20/10* | (2012.01) | |
| *G06Q 20/32* | (2012.01) | |
| *G06Q 20/38* | (2012.01) | |
| *G06Q 20/40* | (2012.01) | |
| *G06Q 40/03* | (2023.01) | |
| *G06Q 50/26* | (2012.01) | |
| *H04L 9/32* | (2006.01) | |

(52) U.S. Cl.
CPC ..... *G06Q 20/3221* (2013.01); *G06Q 20/3223* (2013.01); *G06Q 20/3226* (2013.01); *G06Q 20/326* (2020.05); *G06Q 20/3829* (2013.01); *G06Q 20/4012* (2013.01); *G06Q 20/40145* (2013.01); *G06Q 40/03* (2023.01); *G06Q 50/265* (2013.01); *H04L 9/3213* (2013.01); *H04L 9/3268* (2013.01); *G06Q 2220/00* (2013.01)

(58) Field of Classification Search
CPC ........... G06Q 20/3226; G06Q 20/3829; G06Q 20/4012; G06Q 20/40145; G06Q 40/025; G06Q 50/265; G06Q 2220/00; G06F 9/54; H04L 9/3213; H04L 9/3268

See application file for complete search history.

(56) References Cited

U.S. PATENT DOCUMENTS

| | | | | |
|---|---|---|---|---|
| 2014/0149283 | A1* | 5/2014 | Roselli | G06Q 20/12 705/39 |
| 2014/0250006 | A1* | 9/2014 | Makhotin | G06Q 20/326 705/41 |
| 2015/0106905 | A1* | 4/2015 | Fang | H04L 63/0815 726/8 |

FOREIGN PATENT DOCUMENTS

| | | | |
|---|---|---|---|
| KR | 10-2002-0079053 | * | 10/2002 |
| KR | 10-2002-0079053 A | | 10/2002 |
| KR | 10-2008-0075956 | * | 8/2008 |
| KR | 10-2008-0075956 A | | 8/2008 |
| KR | 10-2009-0061158 | * | 6/2009 |
| KR | 10-2009-0061158 A | | 6/2009 |
| KR | 10-2011-0028123 | * | 3/2011 |
| KR | 10-2011-0028123 A | | 3/2011 |
| KR | 10-2013-0108049 | * | 10/2013 |
| KR | 10-2013-0108049 A | | 10/2013 |
| KR | 10-2016-0031446 | * | 3/2016 |
| KR | 10-2016-0031446 A | | 3/2016 |
| KR | 10-1651696 B1 | * | 9/2016 |
| KR | 10-2016-0115188 | * | 10/2016 |
| KR | 10-2016-0115188 A | | 10/2016 |
| KR | 10-2016-0142032 | * | 12/2016 |
| KR | 10-2016-0142032 A | | 12/2016 |
| KR | 10-2017-0052126 | * | 5/2017 |
| KR | 10-2017-0052126 A | | 5/2017 |
| KR | 10-2017-0140824 | * | 12/2017 |
| KR | 10-2017-0140824 A | | 12/2017 |
| KR | 20130108049 A | * | 10/2018 |
| WO | WO2018/117288 | * | 12/2016 |
| WO | WO-2018084393 A1 | * | 5/2018 |

OTHER PUBLICATIONS

International Search Report from corresponding PCT Application No. PCT/KR2019/003424, dated Jul. 3, 2019, with English translation.

* cited by examiner

BANKING PROCESSING METHOD AND COMPUTER-READABLE STORAGE MEDIUM HAVING APPLICATION FOR BANKING PROCESSING STORED THEREIN

CROSS-REFERENCE TO RELATED APPLICATIONS

This application is a national phase application of PCT Application No. PCT/KR2019/003424, filed on 25 Mar. 2019, which claims benefit of Korean Patent Application 10-2018-0034690, filed on 26 Mar. 2018, Korean Patent Application 10-2018-0034691, filed on 26 Mar. 2018 and Korean Patent Application 10-2018-0035456, filed on 27 Mar. 2018. The entire disclosure of the applications identified in this paragraph are incorporated herein by references.

FIELD

The present disclosure relates to a banking business processing method and a computer-readable storage medium having a banking business processing application stored therein.

BACKGROUND

Internet banking means a service that processes various financial transactions, such as deposit and withdrawal provided by a bank, by using Internet, and uses various kinds of financial information and functions. To this end, a user may open an account provided by a bank and use Internet banking through the corresponding account.

In order to use Internet banking, the user installs an agent such as application in a user terminal and processes a banking business in conjunction with a server, which manages the banking business, through the corresponding agent.

Therefore, the user may process various banking businesses by using an application even without directly visiting a bank. Particularly, a technology of processing an account opening service through an application in an untact manner has been recently developed in view of improvement of user convenience.

However, if the account opening service is processed in an untact manner, problems may occur in that an account may be opened under disguised ownership through fake ID, etc. and this account may be used illegally. Therefore, in opening an account in an untact manner, the need of a technology of permitting an account opening for only a request of a valid user has been increased.

Meanwhile, in order to prevent an account from being illegally opened in opening the account in an untact manner, various processes of receiving customer identification information such as customer due diligence (CDD) or enhanced due diligence (EDD) and identifying a user's real name through ID card are performed.

However, if an account is opened on a mobile environment as described above, a user should repeatedly perform the process of inputting information as above when an agent is re-executed after being terminated on the ground that no action is sensed on the agent for a certain time period due to other tasks performed during account opening, a user terminal enters a shade zone, or a battery of the user terminal is run out, whereby a problem occurs in that the user's inconvenience may be increased.

Therefore, the need of a technology of minimizing a user's inconvenience in the process of opening an account in an untact manner has been also increased.

In addition, in case of a banking business processing application in the related art, since the application operates to always display a predetermined initial page which is set when the application is executed, there is inconvenience in that the user should directly search for a desired page. For example, both a user who has initially executed an application and a user who has completely subscribed membership by using an application may receive the same page, and there is inconvenience in that the users should directly search for a membership subscription page or a login page, which is required for the users, from the corresponding page.

Also, even in the case that a user who has set login information for accessing an application re-installs the application after deleting the application from the user terminal or initially executes the application in the user terminal changed by device change, since the user should directly search for a required page, there is inconvenience in using the application.

Therefore, the need of a technology of improving a user's convenience in using an application is also increased.

SUMMARY

Technical Problems

The present disclosure is intended to fulfill the aforementioned needs, and an object of the present disclosure is to improve a user's convenience by opening an account in an untact manner and permit a valid user to open an account through a plurality of real name identification processes.

Also, another object of the present disclosure is to improve a user's convenience in the process of opening an account in an untact manner.

Also, other object of the present disclosure is to display a suitable page in accordance with a step of executing a banking business processing application and to minimize a user's inconvenience when a user executes the banking business processing application after re-installation of the application or device change.

Technical Solutions

To achieve this object and other advantages, according to one aspect of the present disclosure, a banking business processing method performed by a processing logic including a banking business processing application embodied on a user terminal and a computer-readable storage medium comprises the steps of identifying the existence of a certificate for identifying a history in which the banking business processing application has been previously executed by searching for a hardware secure element of the user terminal when the banking business processing application is driven; identifying the existence of a token key for identifying whether login information of a user has been set by searching for the secure element when the existence of the certificate is identified; setting the login information of the user by providing a membership subscription page for setting the login information of the user when the existence of the token key is not identified; and opening an account in accordance with a request of the user who has set the login information, wherein the step of opening the account includes sequentially displaying account opening pages for receiving information required for account opening; and sequentially storing pages completely input by the user, and if the banking business processing application is re-executed after being terminated before the account is completely opened, next page of the completely input page is displayed to allow the user to subsequently perform account opening.

In another aspect of the present disclosure, a computer-readable storage medium in which a banking business processing application is stored is a computer-readable storage medium in which a banking business processing application comprised of command languages to allow a banking business processing method to be performed by a processor of a user terminal, the banking business processing method comprising the steps of identifying the existence of a certificate for identifying a history in which the banking business processing application has been previously executed by searching for a hardware secure element of the user terminal; identifying the existence of a token key for identifying whether login information of a user has been set by searching for the secure element when the existence of the certificate is identified; setting the login information of the user by providing a membership subscription page for setting the login information of the user when the existence of the token key is not identified; and opening an account in accordance with a request of the user who has set the login information, wherein the step of opening the account includes sequentially displaying account opening pages for receiving information required for account opening; and sequentially storing pages completely input by the user, and if the banking business processing application is re-executed after being terminated before the account is completely opened, next page of the completely input page is displayed to allow the user to subsequently perform account opening.

Advantageous Effects

The present disclosure may improve a user's convenience by opening an account in an untact manner and permit a valid user considered through a plurality of processes of real name identification processes to open an account for only a request of the valid user, whereby the account may be prevented from being illegally opened.

Also, according to the present disclosure, if a banking business processing application is terminated before an account is completely opened, pages input by a user until the banking business processing application is terminated are stored, whereby next page of a page completely input when the banking business processing application is re-executed may be displayed to improve a user's convenience in the process of opening an account.

Also, according to the present disclosure, at least one of certificates for identifying a history of a banking business processing application, which has been previously executed, and a token key for identifying whether login information has been set may be managed separately, whereby a page suitable for a user may be displayed based on at least one of the certificate and the token key to improve the user's convenience.

DETAILED DESCRIPTION

In this specification, in adding reference numbers to elements of respective drawings, it is to be noted that the same reference elements have the same reference numbers if possible even though the same reference elements are shown on different drawings.

Terms disclosed in this specification should be understood as follows.

The term of a singular expression should be understood to include a multiple expression as well as the singular expression if there is no specific definition in the context. The terms such as "the first" and "the second" are used only to differentiate one element from other elements. Thus, a scope of claims is not limited by these terms.

Also, it should be understood that the term such as "include" or "have" does not preclude existence or possibility of one or more features, numbers, steps, operations, elements, parts or their combinations.

It should be understood that the term "at least one" includes all combinations related with any one item. For example, "at least one among a first element, a second element and a third element" may include all combinations of two or more elements selected from the first, second and third elements as well as each element of the first, second and third elements.

Hereinafter, the embodiments of the present disclosure will be described with reference to the accompanying drawings.

Figure 1:
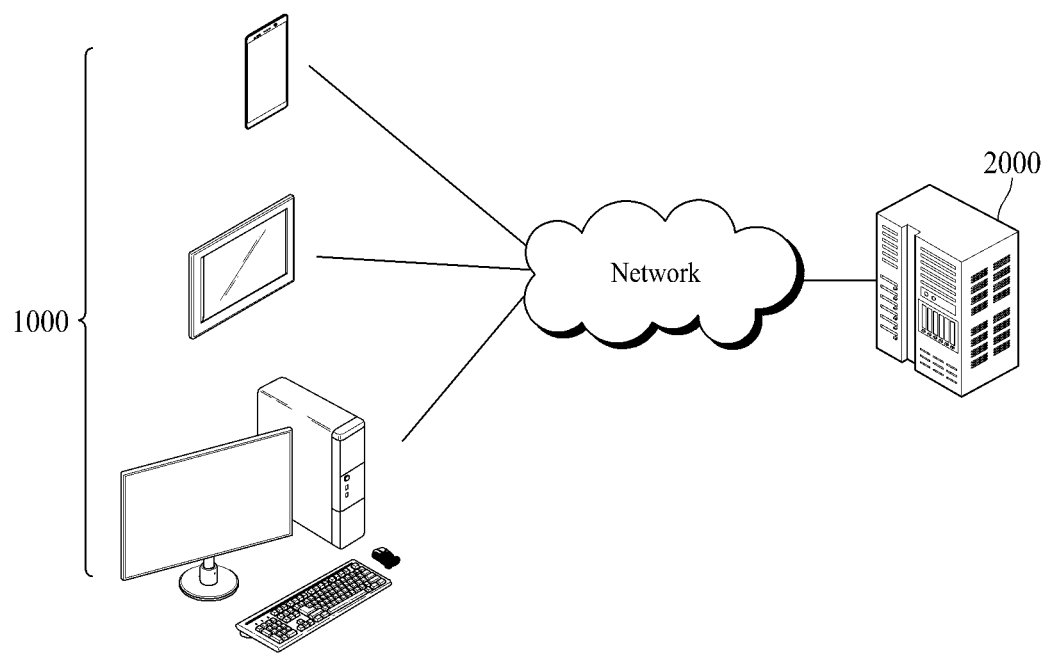
FIG. 1 is a view illustrating a banking business processing application and a banking business management server according to the embodiment of the present disclosure.
Figure 2:
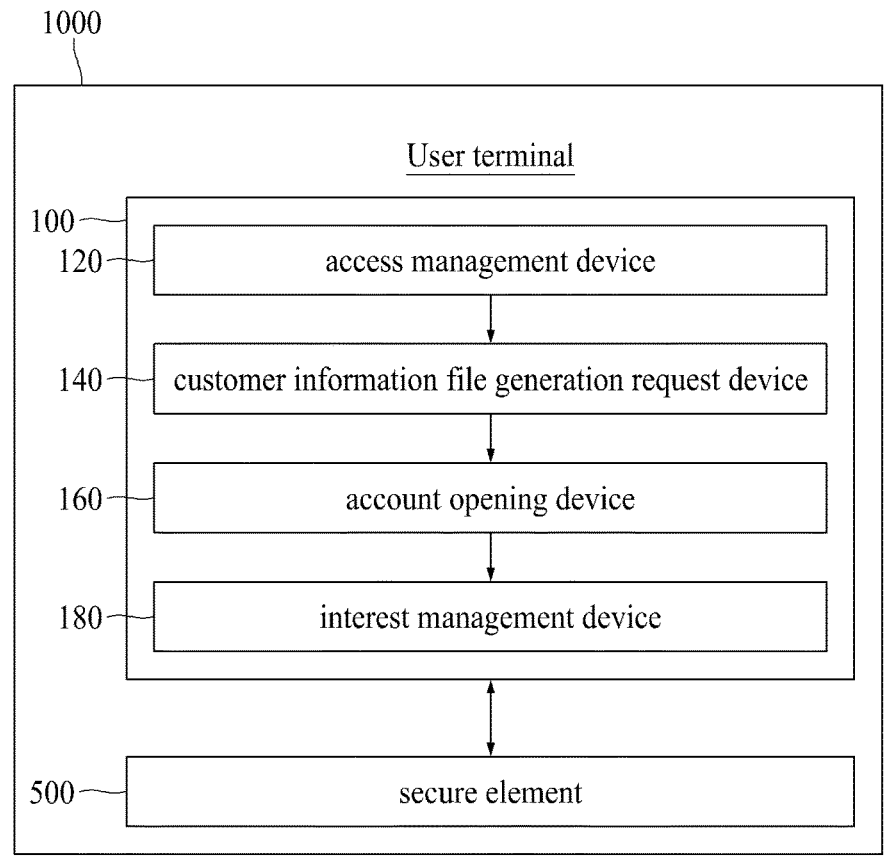
FIG. 2 is a schematic view briefly illustrating a user terminal provided with a banking business processing application according to the embodiment of the present disclosure.
Figure 3:
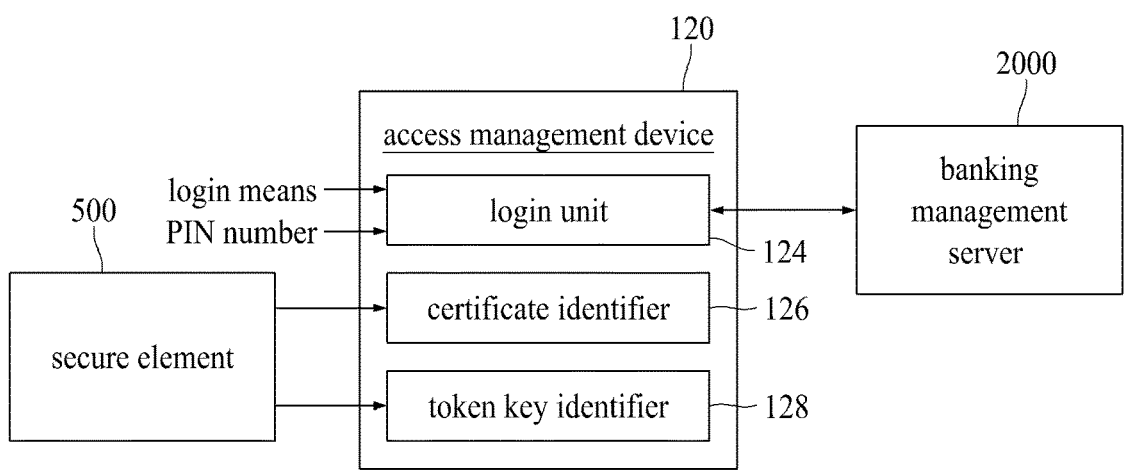
FIG. 3 is a detailed view illustrating an access management device of a banking business processing application according to the embodiment of the present disclosure.
Figure 6:
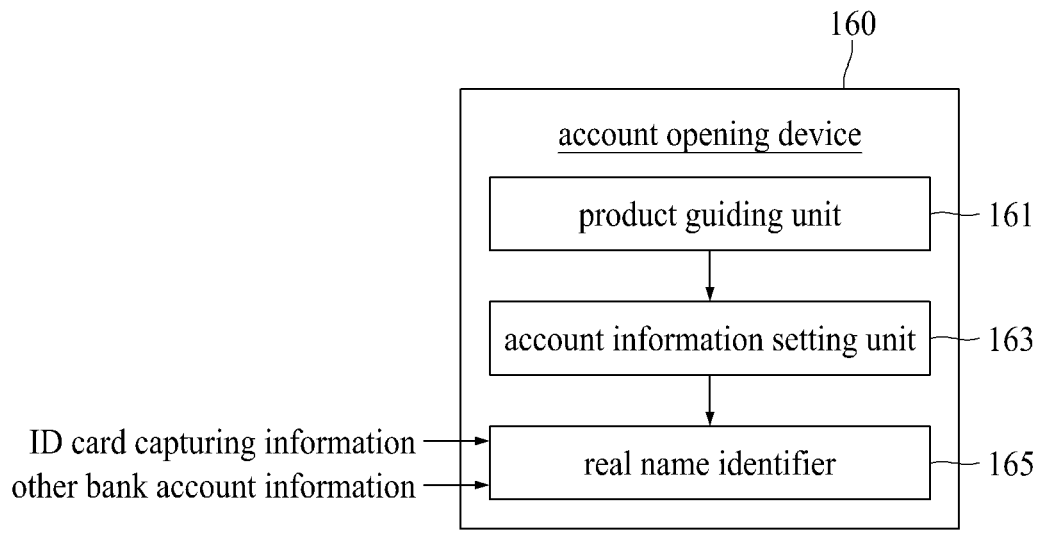
FIG. 6 is a detailed view illustrating an account opening device of a banking business processing application according to the embodiment of the present disclosure.
Figure 9:
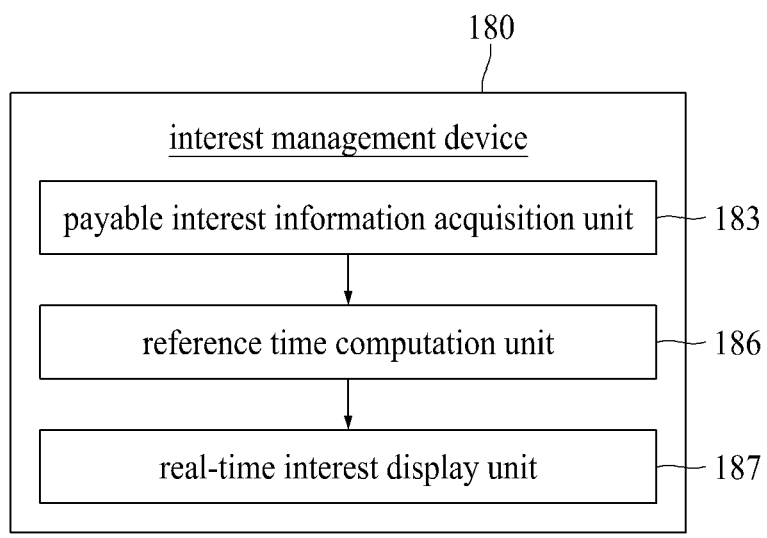
FIG. 9 is a detailed view illustrating an interest management device of a banking business processing application according to one embodiment of the present disclosure.

FIG. 1 is a view illustrating a banking business processing application and a banking business management server according to the embodiment of the present disclosure, FIG. 2 is a schematic view briefly illustrating a user terminal provided with a banking business processing application according to the embodiment of the present disclosure, FIG. 3 is a detailed view illustrating an access management device of a banking business processing application according to the embodiment of the present disclosure, FIG. 6 is a detailed view illustrating an account opening device of a banking business processing application according to the embodiment of the present disclosure, and FIG. 9 is a detailed view illustrating an interest management device of a banking business processing application according to one embodiment of the present disclosure.

An application for processing a banking business (hereinafter, referred to as 'agent') 100 according to the embodiment of the present disclosure processes a banking business in accordance with a user's request. The agent 100 may permit a user who has subscribed membership to open an account. The agent 100 may manage interest accumulated in the account which is opened, and may display the interest to be accumulated, in real time.

To this end, the agent 100, as shown in FIG. 2, includes an access management device 120, an account opening device 160, and an interest management device 180. Hereinafter, the agent 100 of the present disclosure will be described in more detail with reference to FIGS. 1 and 2.

The access management device 120 proceeds to subscribe membership for a user who intends to use the agent 100, by interacting with a banking business management server 2000. In one embodiment, the access management device 120 may proceed to subscribe membership by collecting personal information of the user.

Also, the access management device 120 manages login information of a user who has completely subscribed membership. In one embodiment, the access management device 120 may interact with the banking business management server 2000 if login information is input from a user during membership subscription, whereby the input login information may be set in the banking business management server 2000. The login information may include a login means input to the access management device 120 by the user for login, wherein the login means may include at least one of pattern information to which keys on a keypad are connected, biometric information such as fingerprint/face/iris, and a certificate password. However, the login means that may be used in the present disclosure is not limited to the aforementioned description, and therefore may include various kinds of other information. Also, the login information may further include a PIN number used as an authentication means for processing a banking business.

The account opening device 160 may allow an account to be opened by the banking business management server 2000 by requesting the banking business management server 2000 to open the account in accordance with a request of a user who has completely subscribed membership. An account capable of being opened through the account opening device 160 may include at least one of the following: a demand account, a deferred deposit account and an accumulative deposit account.

In one embodiment, the account opening device 160 may receive real name verification information from a user, and may request the banking business management server 2000 to open an account for a request of a user whose real name has been verified through the corresponding real name verification information. The real name verification information may include ID card information including a user's ID card which is captured, and a user's other bank account information. The account opening device 160 may complete the account opening by transmitting a set amount of an account requested by a user, an interest rate, etc. to the banking business management server 2000.

The interest management device 180 manages an interest of the opened account. The interest management device 180 may acquire information on an interest amount payable to the account at a preset date of interest payment based on a deposit residual and an interest rate of the account. The information on an interest amount payable may mean an interest amount to be paid to the account at the date of interest payment. The interest management device 180 may display the interest amount to be paid to the account at the date of interest payment.

Also, the interest management device 180 may display an expected interest to be accumulated from the account opening date to the current time, in real time. Therefore, the agent 100 according to the present disclosure may display an expected interest to be accumulated, in real time, separately from an interest amount actually payable to the account at the date of interest payment, whereby the user may feel pleasure based on maintenance of the corresponding account by identifying an interest accumulative state.

Although the above description is based on that the agent 100 includes the access management device 120, the account opening device 160 and the interest management device 180, this is for convenience of description. If the agent 100 is embodied as an application driven by being embedded in the user terminal 1000, the corresponding application may integrally perform functions of the access management device 120, the account opening device 160, and the interest management device 180.

In this embodiment, the application may be downloaded through an on-line market such as app store or google play and then installed in the user terminal 1000, or may be installed in the user terminal 1000 when the user terminal 1000 is manufactured by a terminal manufacturer.

The user terminal 1000 may include a personal computer (PC) or notebook computer provided with wire Internet access and browsing functions, a notebook computer or mobile terminal provided with wireless LAN/portable Internet access and browsing functions, a PCS (Personal Communication System) provided with access and browsing functions to a mobile communication network, a GSM (Global System for Mobile) terminal, a PDA (Personal Digital Assistant) or a smart phone.

As shown in FIG. 2, the agent 100 may further include a customer information file generation request device 140.

The customer information file generation request device 140 requests the banking business management server 2000 to generate customer information files. The customer information file generation request device 140 requests the banking business management server 2000 to generate a customer information file of the corresponding user by receiving customer information from the user through the access management device 120. In one embodiment, the customer information may include a user's name and a resident registration number, and the customer information file generation request device 140 may receive customer information from a user who has completely set login information or PIN number.

In the present disclosure, the customer information input for customer information file generation is to fulfill an obligation for untact real name verification in view of real-name financial transaction law by generating customer information for a user who is capable of opening an account.

In accordance with this embodiment, if the customer information file generation request device 140 transfers the customer information file generation request to the banking business management server 2000, the banking business management server 2000 generates a customer information file for a corresponding user. In detail, if the customer information file generation request including customer information is received from the customer information file generation request device 140, the banking business management server 2000 determines whether the corresponding user is a user who can open an account, based on the corresponding customer information. For example, the banking business management server 2000 determines whether the corresponding user is a user who can open an account by determining whether an age of a user corresponds to an age that is able to open an account based on the user's name and resident registration number included in customer information, and determining whether the user's name is matched with the resident registration number. If the corresponding user is a user who can open an account, the banking business management server 2000 may generate a customer information file of the corresponding user.

In this way, according to the present disclosure, since the banking business management server 2000 generates the customer information file for the corresponding user in accordance with the customer information file generation request transmitted from the customer information file generation request device 140, every information of users who have completed membership subscription may be managed by one file, whereby mass information of the users may efficiently be managed.

In the description of the aforementioned embodiment, the account opening is permitted when it is possible to generate the customer information file. However, in the modified embodiment, in case of a user who has a difficulty in generating a customer information file, such as foreigner or minor, the customer information file may be generated using other customer information (for example, foreigner registration number, information as to a guardian's consent, or a guardian's resident registration number) other than a resident registration number or name required for generation of the customer information file.

Hereinafter, a detailed configuration of the access management device 120 will be described with reference to FIG. 3.

As shown in FIG. 3, the access management device 120 may include a login unit 124, and may further include at least one of the following: a certificate identifier 126 and a token key identifier 128.

The login unit 124 manages login information for allowing a user to access the agent 100. To this end, the login unit 124 receives information for the user's authentication by providing the user with an intro page when the agent 100 is initially executed. If the information for the user's authentication is received, the login unit 124 may guide membership subscription by displaying a membership subscription page for the user.

In the first embodiment, the login unit 124 may directly receive the information for the user's certification through the intro page, and may permit the user who has completed authentication to subscribe membership. For example, if the user terminal 1000 is a device having a preset number, such as a mobile terminal, the login unit 124 may certificate the user through the user authentication using a mobile terminal number.

In the second embodiment, the login unit 124 may permit the user to subscribe membership through interaction with another application installed in the user terminal 1000 without directly receiving the information for the user's authentication. For example, if the agent 100 is embodied as an application installed in the user terminal 1000, the login unit 124 may certificate the user based on membership subscription information registered in another application installed in the user terminal 1000 by interacting with another application. Therefore, the agent 100 according to the present disclosure may improve user convenience by simplifying a membership subscription process through interaction with another application. However, the agent 100 according to the second embodiment performs the same user authentication process as that of the first embodiment to process a banking business such as a user's account opening in the future.

Also, the login unit 124 may set login information on a user who has completed authentication to the banking business management server 2000 by interacting with the banking business management server 2000. The login unit 124 may receive pattern information to which keys on a keypad are connected, biometric information such as fingerprint/face/iris, and a certificate password from the user as a login means, and may allow the input information to be set as the login information. The login unit 124 may transmit the login information to the banking business management server 2000 to allow the banking business management server 2000 to set the login information. If the login information is input from the user, the login unit 124 may transmit the input login information to the banking business management server 2000 to request whether a login of the corresponding user is permitted or not. Therefore, in the embodiment of the present disclosure, access of a user who has set login information is only permitted, and access of a user having no valid right to the agent 100 may be prohibited.

In one embodiment, the login unit 124 may additionally receive a PIN number as login information. The corresponding PIN number may be used as, but not limited to, an authentication means for processing a banking business of a user through the agent 100.

Figure 4:
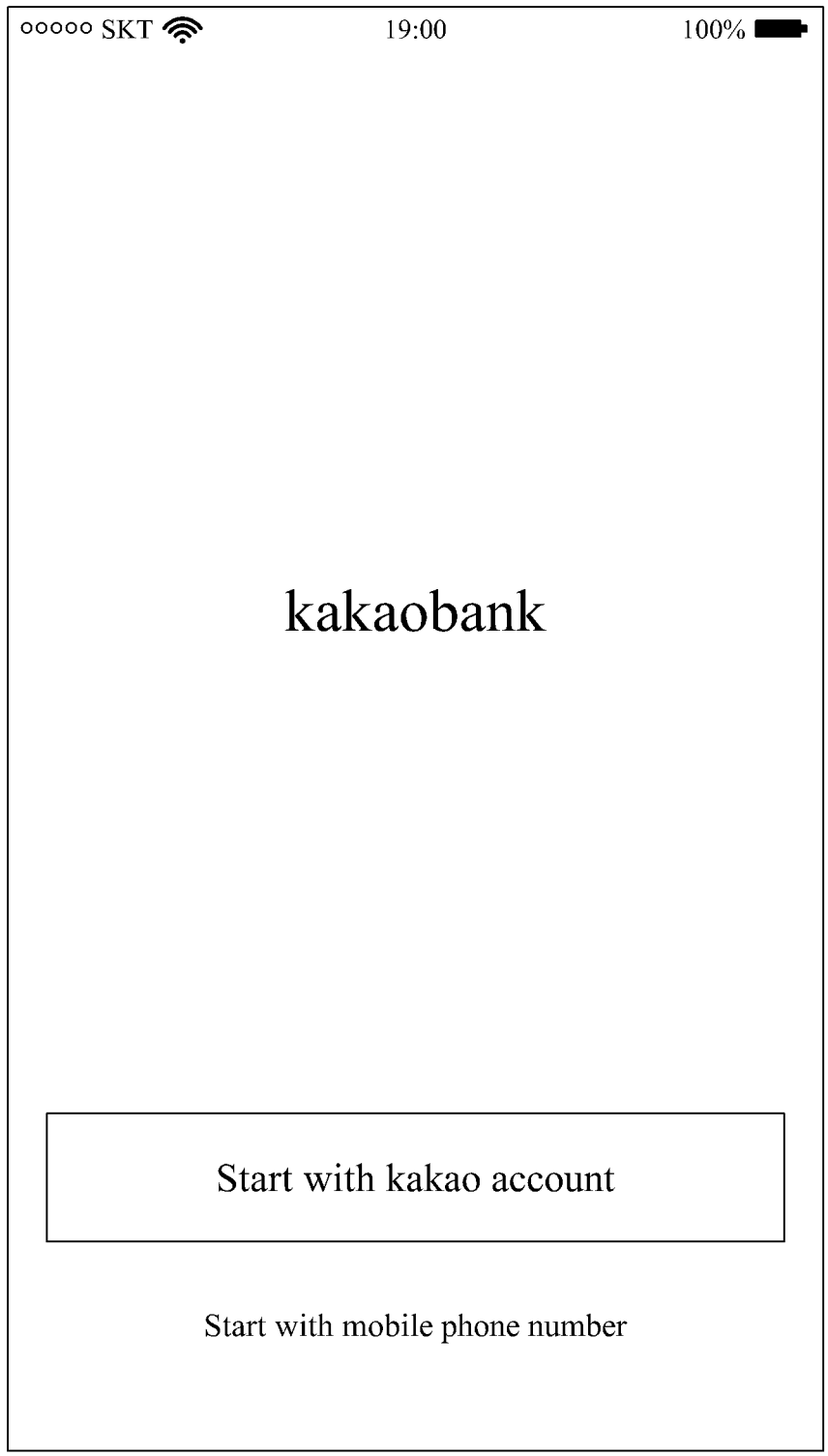
FIG. 4 is a view illustrating an intro page displayed through an access management device according to the embodiment of the present disclosure.
Figure 5A:
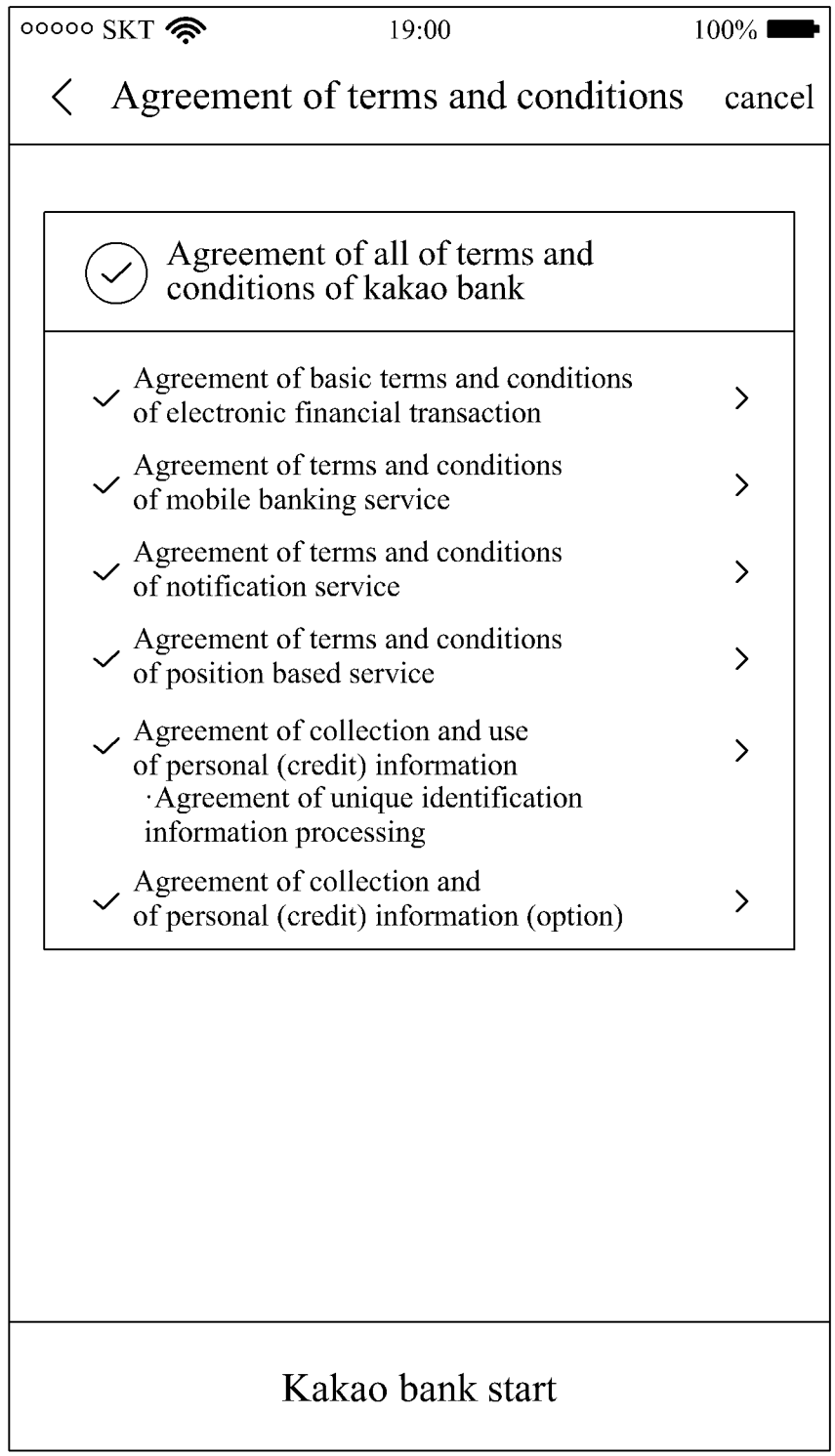
FIG. 5A is a view illustrating a membership subscription page displayed through an access management device according to the embodiment of the present disclosure.
Figure 5B:
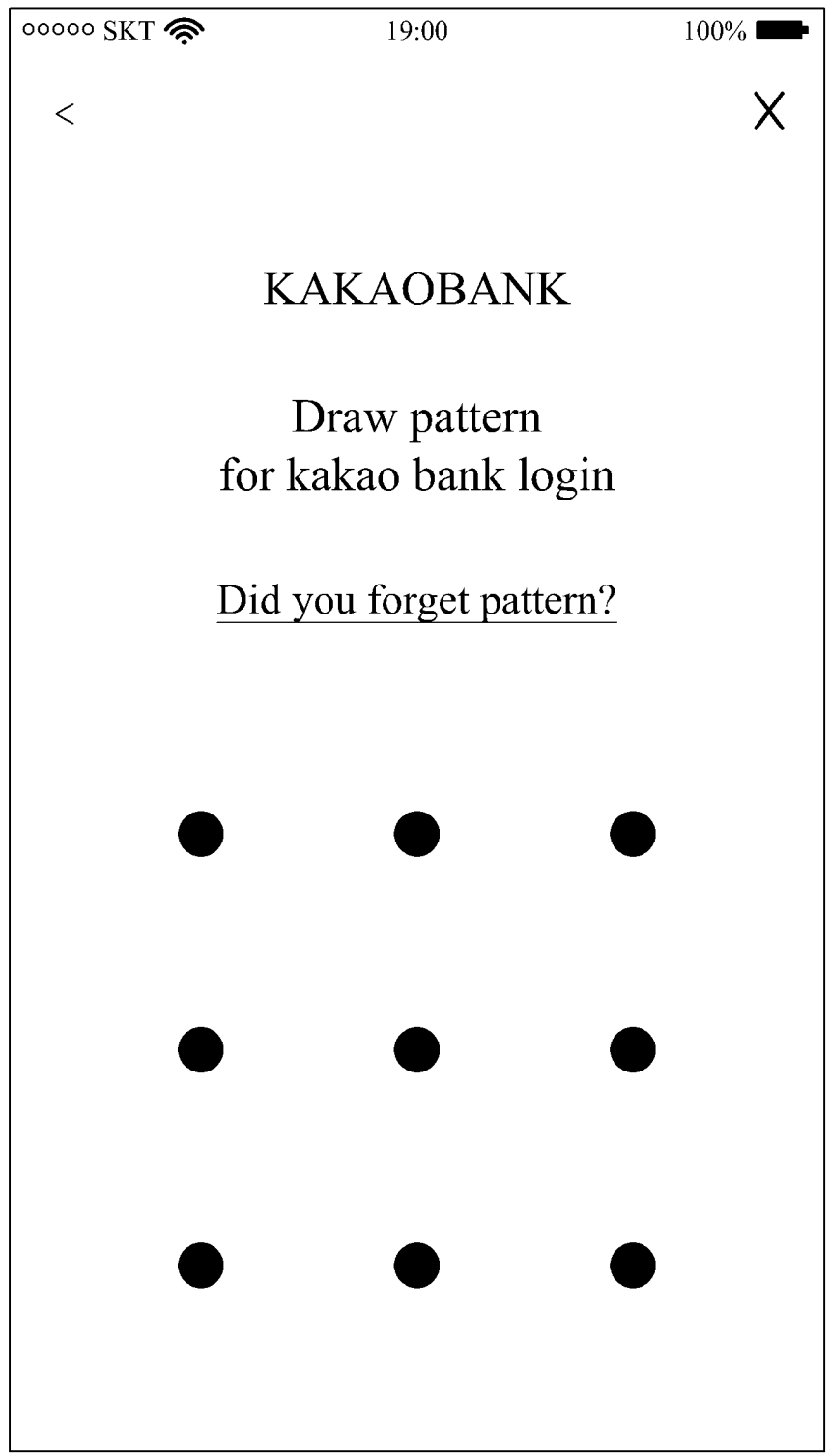
FIGS. 5B, 5C and 5D are views illustrating a login page displayed through an access management device according to the embodiment of the present disclosure.
Figure 5C:
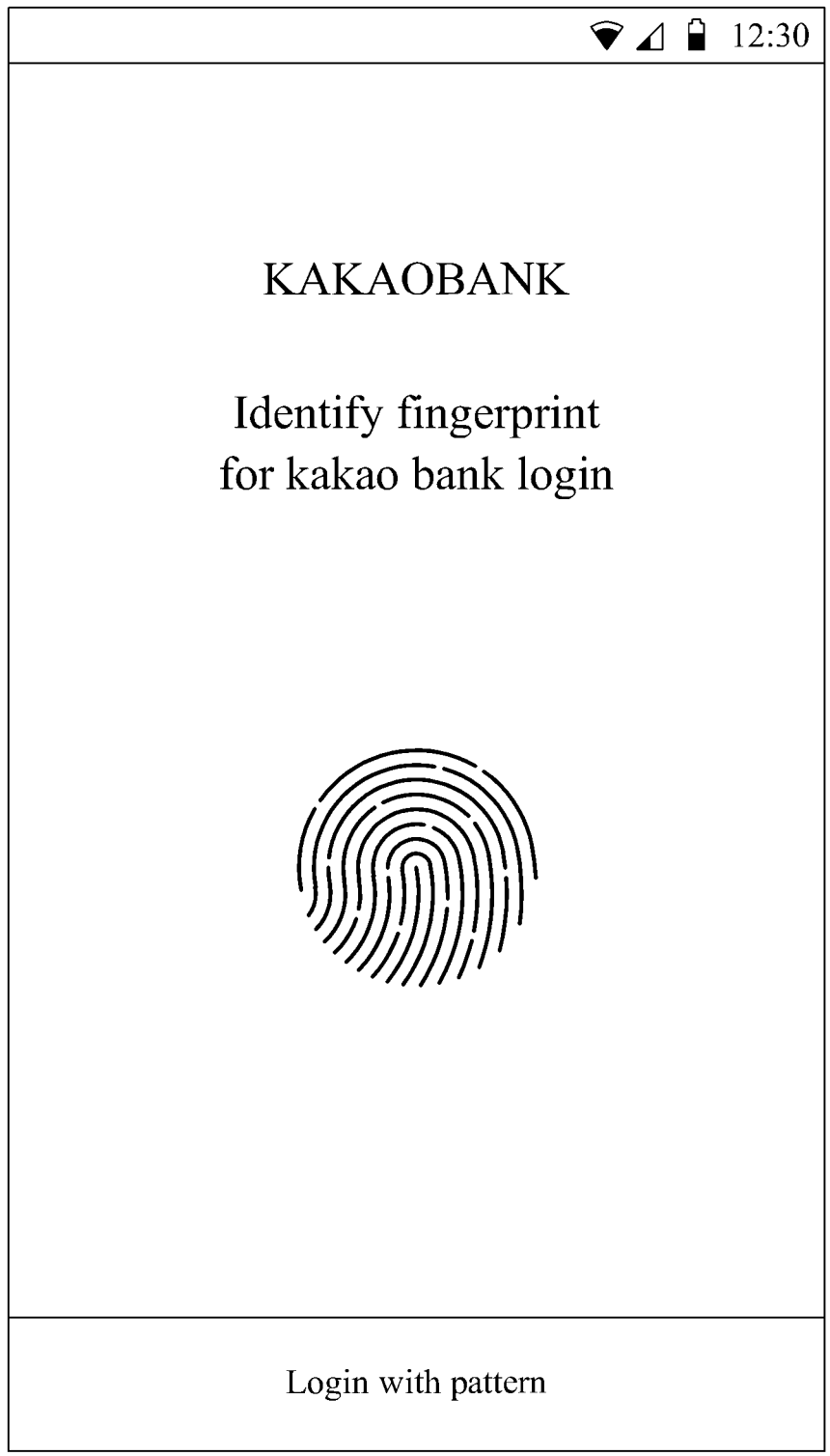
Figure 5D:
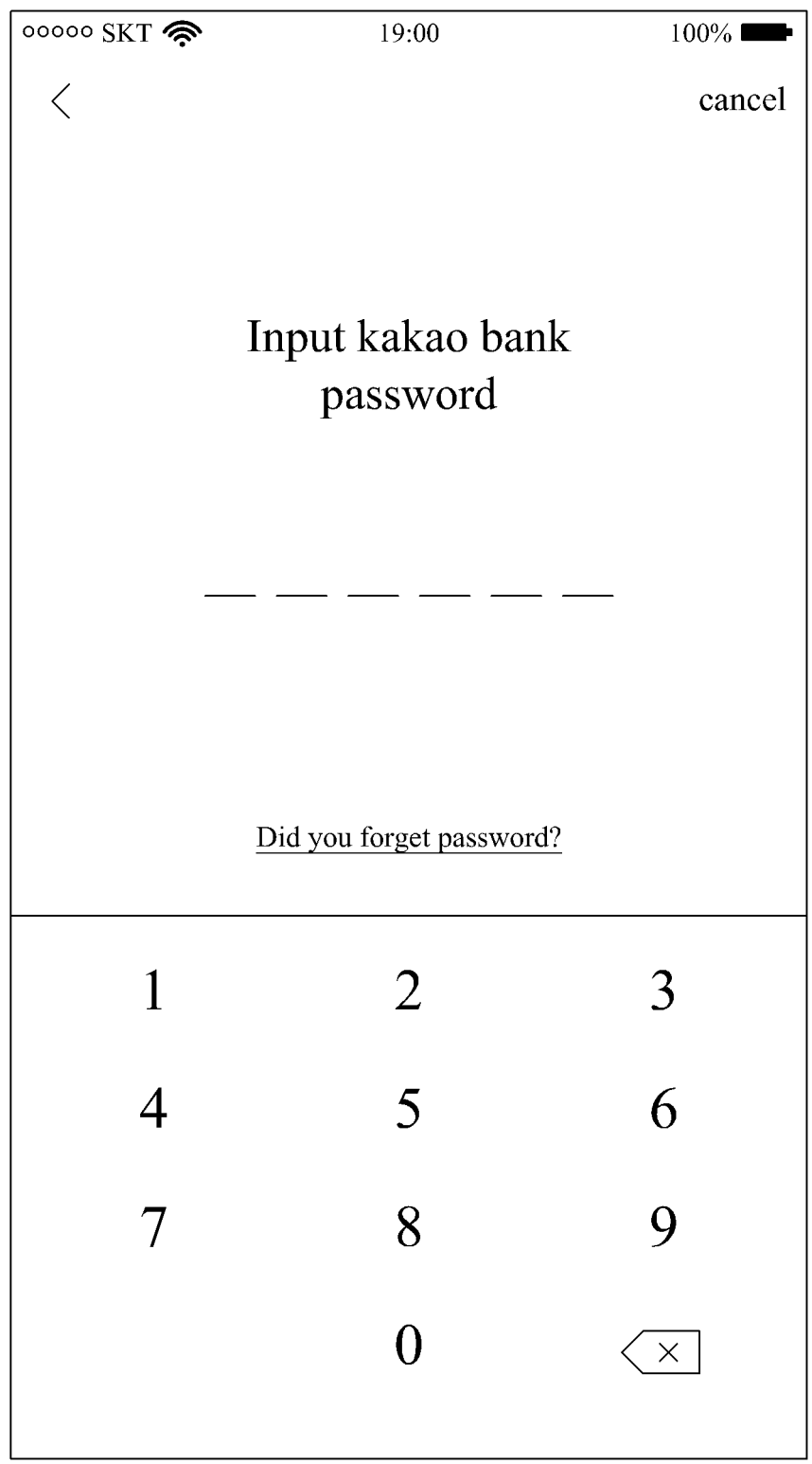

FIG. 4 is a view illustrating an example of an intro page displayed through an access management device according to the embodiment of the present disclosure, FIG. 5A is a view illustrating an example of a membership subscription page displayed through an access management device according to the embodiment of the present disclosure, and FIGS. 5B to 5D are views illustrating an example of a login page displayed through an access management device according to the embodiment of the present disclosure.

In detail, FIG. 5B is an example of a screen for inputting pattern information as a login means set in the login unit 124, FIG. 5C is an example of a screen for inputting fingerprint information as a login means set in the login unit 124, and FIG. 5D is an example of a screen for inputting a PIN number set in the login unit 124.

In the embodiment of the present disclosure, the login unit 124 may allow a user to start the agent 100 by providing an intro page as shown in FIG. 4 when the agent 100 is initially executed, and may guide membership subscription of a user by providing a membership subscription page as shown in FIG. 5A, and may guide login of a user by providing a login page as shown in FIGS. 5B to 5D.

Particularly, in the embodiment of the present disclosure, the login unit 124 may display a page most suitable for a user based on whether the agent 100 has been previously used when the agent 100 is executed. For example, the login unit 124 identifies whether a certificate is stored, when the agent 100 is executed 100. If the certificate is not stored, the login unit 124 determines whether the corresponding user terminal 1000 initially executes the agent 100, and then generates the certificate.

If the certificate is completely generated or already stored, the login unit 124 identifies whether a history in which login information has been set exists. If the history in which login information has been set does not exist, the login unit 124 guides membership subscription of a user by sequentially providing an intro start page shown in FIG. 4 and a membership subscription page shown in FIG. 5A. If the history in which login information has been set exists, the login unit 124 guides login of a user by providing a login page shown in FIGS. 5B to 5D.

Hereinafter, the login unit 124 will be described in more detail.

The login unit 124 may request the user terminal 1000 to generate the certificate if the agent 100 is initially executed in the user terminal 1000, that is, if there is no history in which the agent 100 has been executed in the corresponding user terminal 1000. The certificate is intended to identify a history in which the agent 100 installed in the user terminal 1000 has been previously executed. Therefore, in the embodiment of the present disclosure, the login unit 124 may identify whether the history in which the agent 100 has been executed in the corresponding user terminal 1000, based on whether the certificate exists.

The user terminal 1000 generates a private key and a public key in accordance with a request of the login unit 124. At this time, the user terminal 1000 generates a private key and a public key within a hardware secure element 500 by using an application programming interface (API) provided by its operating system (OS). Afterwards, the user terminal 1000 transmits the public key to the banking business management server 2000 through the login unit 124. The banking business management server 2000 generates the certificate by encrypting (signing) the received public key by using the private key of the banking business management server 2000, and transfers the generated certificate to the login unit 124. The login unit 124 stores the received certificate in the secure element 500.

In this way, the certificate is stored in the secure element 500 of the user terminal 1000 without being stored in a storage inside the agent 100 to safely keep the certificate regardless of external attack against the agent 100. Therefore, the agent 100 may identify whether the history in which the agent 100 has been installed exists, with reference to the secure area 500 of the user terminal 1000.

Meanwhile, the banking business management server 2000 may store the public key transferred from the login unit 124 and manage the login information by matching the login information with the public key. Therefore, the agent 100 and the banking business management server 2000 according to the present disclosure may permit the banking business only if the public key corresponding to the login information is matched with the public key corresponding to information of the user terminal 1000 in which the agent 100 is installed. In this case, the third party may be prevented from processing the banking business by login to the agent installed in other user terminal through login information of a valid user, whereby security for the banking business may be more enhanced.

Also, the login unit 124 may receive a token key from the banking business management server 2000 if the login information is set by a user. The token key is intended to identify whether login information has been set through the agent 100. Therefore, in the embodiment of the present disclosure, whether login information has been set may be identified based on whether the token key exists. The login unit 124 may receive the token key generated by the banking business management server 200 if the login information is set by interacting with the banking business management server 2000. The token key may be generated by various values unique per agent 100.

The login unit 124 stores the received token key in the secure element 500 of the user terminal 1000. In this way, the token key is stored in the secure element 500 of the user terminal 1000 without being stored in the storage inside the agent 100 to safely keep the token key regardless of external attack against the agent 100. Therefore, the agent 100 may identify whether the login information has been set, with reference to the secure area 500 of the user terminal 1000. At this time, the banking business management server 2000 may manage the login information received from the login unit 124 by matching the login information with the public key and the token key.

Through the above process, the login unit 124 may allow the user terminal 1000 to store the certificate in the secure element 500 by requesting generation of the certificate if the agent 100 is initially executed, and may receive the token key from the banking business management server 2000 if the login information of the user is set and then store the token key in the secure element, whereby an optimal page required for the user may be displayed using the certificate and the token key stored in the secure element 500 when the agent 100 is executed.

The certificate identifier 126 identifies whether the certificate has been stored in the secure area 500 of the user terminal 1000. The certificate identifier 126 may identify whether the certificate has been stored in the secure area 500 if the agent 100 installed in the user terminal 1000 is executed. If the existence of the certificate in the secure area 500 is identified by the certificate identifier 126, the login unit 124 may determine that the history in which the agent 100 has been executed through the corresponding user terminal 1000 exists.

On the other hand, if the certificate identifier 126 does not identify the certificate from the secure element 500, the login unit 124 determines that there is no history in which the agent 100 has been executed through the corresponding user terminal 1000, and requests the user terminal 1000 to generate the certificate.

The token key identifier 128 identifies whether the token key exists in the user terminal 1000 if the certificate exists or is completely generated. The token key identifier 128 may identify whether the token key exist in the secure element 500 if the existence of the certificate is identified through the certificate identifier 126 or the certificate is completely generated. If the existence of the token key is identified by the token key identifier 128, the login unit 124 may identify that there is a history in which login information has been set in the agent 100 installed in the corresponding user terminal 1000. In this case, the login unit 124 may display the login page shown in FIGS. 5B to 5D to guide login of the user who has set login information.

In detail, if it is identified by the token key identifier 128 that the token key exists, the login unit 124 encrypts (digital signature) a random number by using a private key stored in the secure element 500, and transmits the encrypted result, the generated random number, the certificate stored in the secure element 500 and the token key to the banking business management server 2000 through the login unit 124. The banking business management server 2000 verifies the encrypted result, the certificate and the token, which are received through the login unit 124. In detail, the banking business management server 2000 verifies the encrypted result by comparing the random number received from the login unit 124 with the random number acquired by decoding the received encrypted result. Afterwards, the banking business management server 2000 decodes the received certificate by using the public key stored therein and compares the decoded certificate with the certificate matched with the corresponding public key, and compares the received token key with the token key stored by being matched with the certificate. As a result of comparison, if all of the certificates and the token keys are valid, the banking business management server 2000 transmits the result to the login unit 124 to allow the login unit 124 to provide a login page. At this time, the banking business management server 2000 may determine whether the corresponding token key is a valid token key directly generated, based on a format of the token key generated when the login information is set. However, since the present disclosure is not limited to this case, a method for determining validity of the token key by means of the banking business management server 2000 may be embodied in various ways.

On the other hand, if the existence of the token key is not identified by the token key identifier 128, the login unit 124 may identify that there is no history in which login information has been set in the agent 100 installed in the corresponding user terminal 1000. In this case, the login unit 124 may sequentially display the intro page shown in FIG. 4 and the membership subscription page shown in FIG. 5A.

As described above, if the agent 100 is executed in the user terminal 1000, the agent 100 according to the present disclosure may omit the process of setting membership subscription and login information if the certificate and the token key are identified, and may display a login page where the set login information may input. Therefore, in the embodiment of the present disclosure, a running speed of the agent 100 may be improved, and convenience of the user in use of the agent 100 may be improved. Also, the agent 100 may improve convenience of the user in use of the agent 100 by displaying the intro page and the membership subscription page for the user if the certificate or the token key is not identified.

Figure 5E:
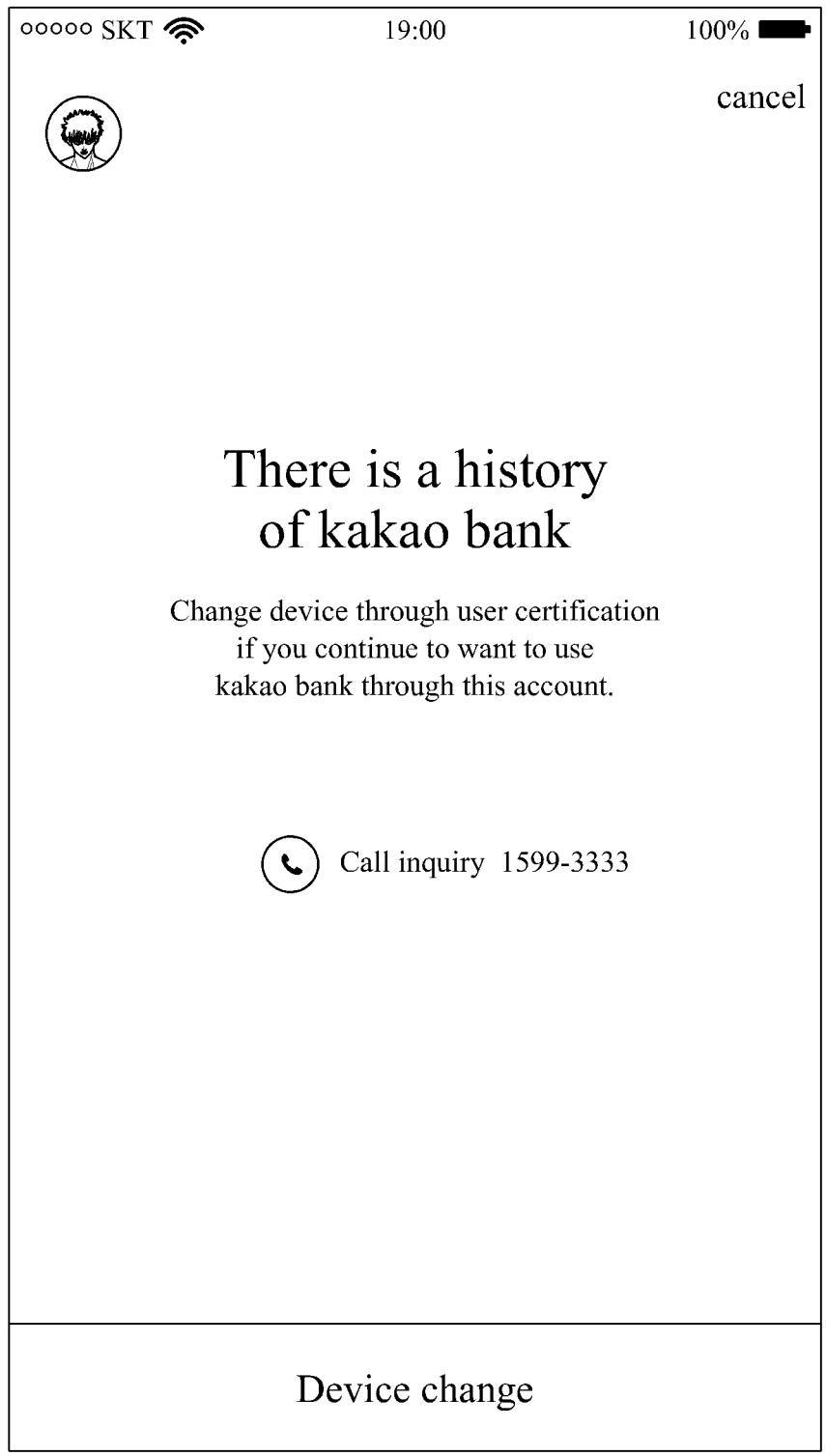
FIG. 5E is a view illustrating a device change page displayed through an access management device according to the embodiment of the present disclosure.

In the aforementioned embodiment, if there is no history in which the login information has been set, the login unit 124 sequentially provides the intro page and the membership subscription page. However, in the modified embodiment, the login unit 124 additionally determines whether the user has subscribed membership after the intro page is provided if there is no history in which login information has been set, and provides the membership subscription page if it is not identified whether the user has subscribed membership. If it is identified that the user has subscribed membership, the login unit 124 may provide a page (hereinafter, referred to as 'device change page') corresponding to device change or agent re-installation by determining device change or agent re-installation. An example of a device change page is shown in FIG. 5E.

In this way, the login unit 124 provides the device change page separately after the intro page. This is because that the user who uses the agent 100 may feel inconvenience if the process of newly subscribing membership and setting login information should be performed through the same process as membership subscription after the membership subscription page is displayed even in the case that the agent 100 is re-installed in the user terminal 1000 after being deleted or the agent 100 is re-installed by device change of the user terminal 1000.

Therefore, in the embodiment of the present disclosure, the new certificate and the token key may be set through a simplified authentication process within the range that security capability in processing a banking business using the agent 100 may be maintained, whereby the user's inconvenience may be minimized.

In detail, if a history in which login information has been set is not identified, the login unit 124 may receive information for user authentication by providing the intro page, and may identify whether the corresponding user is a user who has set login information, based on the received information for user authentication.

In one embodiment, the login unit 124 may additionally determine whether the current state of the user terminal 1000 is a device change state or agent re-installation state by acquiring device identification information uniquely given to the corresponding user terminal 1000 in the process of providing the intro page or receiving information for user authentication, whereby the device change and the agent re-installation may be performed by their respective processes different from each other. For example, the agent re-installation may be performed through an authentication process more simplified than that of the device change.

Meanwhile, for a user who has a history in which login information has been set, as a result of identification based on information for user authentication, the login unit 124 may certify the user by receiving the set login information and real name identification information, and if the login information and real name are completely identified, the login unit 124 may receive the token key from the banking business management server 2000 based on the corresponding login information. At this time, the login unit 124 may receive an ID card from the user for real name identification, but the present disclosure is not limited thereto.

At this time, the login unit 124 may receive a new token key from the banking business management server 2000 but the present disclosure is not limited thereto. Therefore, the login unit 124 may receive the token key, which has been previously used, from the banking business management server 2000. That is, since the banking business management server 2000 manages the login information by matching the login information with the received public key and token key, the banking business management server 2000 may extract the token key matched with the login information input from the user and then provide the extracted token key to the login unit 124.

The login unit 124 may transfer a public key generated by the user terminal 1000 in accordance with execution of the agent 100 to the banking business management server 2000 to allow the banking business management server 2000 to manage the new public key by matching the new public key with the corresponding login information. That is, in case of re-installation of the agent 100 or device change of the user terminal 1000, since a certificate is newly generated, the login unit 124 deletes the previous public key and allows the banking business management server 2000 to register a new public key by transferring the public key to the banking business management server 2000.

On the other hand, as a result of identification based on information for user authentication, if it is determined that there is no history in which login information has been set, the login unit 124 may perform a process of subscribing membership and setting login information or simply perform membership subscription through interaction with other application by providing the membership subscription page as described above.

In this way, in the embodiment of the present disclosure, if re-installation of the agent 100 or device change of the user terminal 1000 occurs, a new certificate and token key may newly be matched with login information through a simplified authentication process based on login information previously set as above, whereby inconvenience that the user who has set login information repeatedly performs an unnecessary process may be minimized. Since a real name of the user may be identified using an ID card in addition to the login information, the third party who has stolen login information of a valid user may be prevented from performing login to the agent of the other user terminal, whereby security capability may be improved.

Hereinafter, a detailed configuration of the account opening device 160 will be described with reference to FIG. 6.

As shown in FIG. 6, the account opening device 160 includes a product guiding unit 161, an account information setting unit 163 and a real name identifier 165. Each operation of the product guiding unit 161, the account information setting unit 163 and the real name identifier 165, which will be described later, may be performed page by page. For example, the product guiding unit 161, the account information setting unit 163 and the real name identifier 165 may perform an account opening process while sequentially displaying account opening page in accordance with an account opening request of a user and sequentially storing the completed page. The account opening page may include a plurality of pages that guide information required for account opening to the user or receive information required for account opening from the user.

The product guiding unit 161 guides products related banking business available through the agent 100 by interacting with the banking business management server 2000. The product guiding unit 161 may guide account products, which include a demand account, a deferred deposit account and an accumulative deposit account, by receiving information about account products from the banking business management server 2000. Therefore, the user may request opening of an account desired to subscribe, among the guided account products.

The account information setting unit 163 sets account information in accordance with a request of a user who desires to open an account by interacting with the banking business management server 2000. The account information setting unit 163 may receive a product request for a desired account and information required for account opening from the user, wherein the information required for account opening may be varied depending on an account which is opened.

For example, if the user desires to open a demand account, the account information setting unit 163 may receive a purpose of use of the corresponding account. The corresponding purpose of use may be considered when a limit account is changed to a general account in accordance with a release request of a limit account for the corresponding demand account.

Also, if the user desires to open a deferred deposit account or an accumulative deposit account, the account information setting unit 163 may additionally receive a set amount desired by the user and a subscription period as well as information input when the demand account is opened. In this case, the account information setting unit 163 may determine an interest rate of the corresponding account based on the input set amount and the subscription period. For example, since corresponding interest rates corresponding to the subscription period are set differently depending on characteristics of each account, the account information setting unit 163 may set an interest rate of an account in accordance with an input of a user.

The account information setting unit 163 may receive customer identification information such as CDD (Customer Due Diligence) and EDD (Enhanced Due Diligence), and may additionally receive FATCA (Foreign Account Tax Compliance Act) in case of a foreign taxpayer. The account information setting unit 163 may allow the user to identify a depositor protection act, illegal/circumvention prohibition guide, etc. by providing the user with commodity terms and conditions and instructions. The account information setting unit 163 may transfer information such as CDD, EDD and FATCA input from the user to the banking business management server 2000, whereby the banking business management server 2000 may manage the user's information which is a base of account opening.

The real name identifier 165 identifies the user's real name in accordance with the user's account opening request by interacting with the banking business management server 2000. The real name identifier 165 may identify the user's real name in an untact manner. In this way, in the embodiment of the present disclosure, since the user's real name may be identified in an untact manner, the user may open an account even without directly visiting a bank, whereby convenience of the user may be improved.

The real name identifier 165 may identify the user's real name through a plurality of real name identification processes. For example, the real name identifier 165 may identify the user's real name by using an image including the user's ID card which is captured, as a primary real name identification process. Also, the real name identifier 165 may identify the user's real name by using other bank account information of the corresponding user as a secondary real name identification process.

In this way, the agent 100 according to the present disclosure may improve convenience of a user who opens an account by opening the account after identifying the user's real name in an untact manner, and may maintain security capability, which may vulnerable in the process of identifying the user's real name in an untact manner, at the same level as a contact manner by certifying the user in a double authentication manner based on an ID card and other bank account information.

Hereinafter, the process of the primary real name identification and the secondary real name identification for identifying the user's real name by means of the real name identifier 165 will be described in detail.

As the primary real name identification, the real name identifier 165 may identify the user's real name by using the user's ID card. To this end, the real name identifier 165 may acquire an image including the user's ID card which has been captured. The real name identifier 165 may acquire the ID card image by capturing the user's ID card by interacting with a camera. The real name identifier 165 may acquire the image including the ID card, such as a resident registration card and a driver's license, which has been captured.

Subsequently, the real name identifier 165 may extract reference information from the acquired ID card image and identify the user's real name based on the extracted reference information. The reference information means information that may identify the user's identity from the ID card, and may include a name, a resident registration number and an issue date. Since the position where the reference information is written is determined in accordance with the ID card, the real name identifier 165 may extract the above reference information by identifying text or number written in the determined position of the acquired image.

Subsequently, the real name identifier 165 may determine whether the corresponding ID card is true, based on the extracted reference information. The real name identifier 165 may transmit the extracted reference information to an external entity (not shown) to request the external entity to determine whether the ID card is true. For example, the real name identifier 165 may request a server (not shown) for providing an untact ID card truth identification service constructed by Korea Financial Telecommunications and Clearings Institute to determine truth of the ID card. For another example, the real name identifier 165 may request a Road Traffic Authority or National Police Agency to determine truth of the ID card if the ID card which is captured is a driver's license, and may request a civil service portal server (for example, "government 24" or "civil service 24") to determine truth of the ID card if the ID card which is captured is a resident registration number.

In the aforementioned embodiment, the real name identifier 165 directly requests the server for providing an untact ID card truth identification service, the Road Traffic Authority, the National Police Agency, or the civil service portal server to determine truth of the ID card. However, in another embodiment, the real name identifier 165 may request the corresponding server or authority to determine truth of the ID card via the banking business management server 2000.

As the primary real name identification process, the real name identifier 165 may allow the user to correct the extracted reference information. For example, since an error may occur in the extracted reference information by reason of image quality of the captured image, which is varied depending on capability of a camera for capturing ID card or a peripheral environment near an image of the ID card, the real name identifier 165 may allow the user to correct the reference information. Therefore, the agent according to the present disclosure may prevent an error from occurring in the user's real name identification as the reference information is extracted in error by external factor for capturing ID card.

However, if correction of the reference information is permitted without limitation, an invalid user may capture a random ID card and correct the reference information. Therefore, the real name identifier 165 may compare correction information corrected by the user with the extracted reference information, and may permit correction only if the correction information is within a predetermined range from the extracted reference information. In one embodiment, the real name identifier 165 may determine whether to permit correction based on a ratio of the correction information to the extracted reference information. In this case, the ratio may be set by reflecting camera capability, etc., and for example, may be set to permit correction only if the ratio of the correction information to the extracted reference information is within 5%.

In another embodiment, the real name identifier 165 may store text or number which is likely to be extracted in error as error information and determine whether to permit correction by determining whether the corrected reference information corresponds to error information. That is, the error information means information for matching text or number expected to be extracted in error with text or number included in specific reference information. For example, text 'kil' is likely to be extracted as 'kim' in error and number '0' is likely to be extracted as '8' in error. Therefore, since the real name identifier 165 may permit correction only if the correction information corrected by the user corresponds to text or number corresponding to previously constructed error information, only the reference information that may be extracted in error may be corrected, whereby validity of untact real name identification may be improved.

Meanwhile, the real name identifier 165 may additionally use the user's name or resident registration number acquired in the process of collecting customer information or identifying user authentication of a mobile phone or customer information, which is previously registered in case of the existing customer, in addition to the extracted reference information, when the correction information corrected by the user is compared with the extracted reference information.

In the aforementioned description, the real name identifier 165 transfers the extracted reference information to the external entity to request the external entity to determine truth of the ID card, but the present disclosure is not limited thereto. Therefore, the real name identifier 165 may directly determine truth of the ID card.

As the secondary real name identification, the real name identifier 165 may identify the user's real name by using the user's other bank account information.

To this end, the real name identifier 165 may receive other bank account information from the user. The other bank account information may include other bank name and other bank account number. The real name identifier 165 may identify whether a real name and a resident registration number of an owner of the other bank account corresponding to the received other bank account number are matched with the corresponding user's real name and resident registration number (hereinafter, 'real name' will be described as a concept including 'resident registration number'), and may deposit a predetermined amount to the other bank account number. At this time, the real name identifier 165 may write identification information including at least one of predetermined text and number as a depositor name, and may complete the secondary real name identification for a user who has input the same identification information as the written identification information by receiving the identification information written in the depositor name from the user.

That is, since the corresponding user may identify a predetermined text or number written in the other bank account by the real name identifier 165 only if the other bank account is a normal account opened by the corresponding user and the corresponding user has a normal access power to the other bank account, the real name identifier 165 may simply complete the secondary real name identification in the aforementioned manner.

In the aforementioned description, the real name identifier 165 deposits a predetermined amount and inputs identification information but the present disclosure is not limited thereto. Therefore, the banking business management server 2000 may perform the above operations, and the real name identifier 165 and the banking business management server 2000 may interact with each other to divisionally perform some operations.

Particularly, the agent 100 according to the embodiment of the present disclosure may asynchronously perform the primary real name identification through the ID card capturing as above and the secondary real name identification through other account information.

In detail, the real name identifier 165 may transfer the reference information extracted from the captured ID card image to the external entity to request the external entity to identify truth of the ID card for the primary real name identification, and may perform the secondary real name identification through the other account information regardless of reception of the result of truth identification. That is, the real name identifier 165 may perform the secondary real name identification before the result of truth identification is received from the external entity.

In more detail, as described above, the real name identifier 165 may request the external entity to determine truth of the ID card in the process of identifying the real name through ID card capturing, and truth determination for the corresponding ID card may be delayed depending on operating time or business process order of the external entity. If the secondary real name identification is performed through other bank account information after the primary real name identification is completed, in accordance with the result of truth identification of the ID card, the user may experience inconvenience to be on standby unnecessarily until the primary real name identification based on determination of truth of the ID card is completed.

Therefore, in the embodiment of the present disclosure, the real name identifier 165 may perform the secondary real name identification through other bank information regardless of reception of the result of truth identification of the ID card from the external entity in the process of the primary real name identification. The real name identifier 165 may guide that account opening application has been completed if the secondary real name identification is completed, whereby the user may finish the process for account opening.

In this way, in the embodiment of the present disclosure, since truth identification of the ID card for the primary real name identification is requested to the external entity and the secondary real name identification are directly performed by interaction between the agent 100 and the banking business management server 2000, the secondary real name identification may first be completed regardless of reception of the result of truth identification of the ID card from the external entity.

Meanwhile, when the result of truth identification of the ID card is received, the real name identifier 165 may guide account opening completion or unavailable account opening to the user in accordance with the corresponding result, thereby reducing the user's unnecessary standby time.

For example, if it is identified that the ID card is not a valid ID card as a result of truth identification of the ID card, the real name identifier 165 may guide that account opening is not available due to an invalid ID card. Also, if it is identified that the ID card is a valid ID card as a result of truth identification of the ID card, since the primary real name identification and the secondary real name identification are all completed, the real name identifier 165 may open an account.

Also, if the primary real name identification and the secondary real name identification are all completed, the real name identifier 165 may request the user to input a PIN number and open an account if the input PIN number is matched with a PIN number of login information set through the access management device 120. Therefore, in the embodiment of the present disclosure, the PIN number set as the login information may additionally be identified, whereby security of untact account opening may be more enhanced.

In the aforementioned embodiment, the primary real name identification may be performed through truth identification of the ID card, and the secondary real name identification may be performed through the other account information. In the modified embodiment, the primary real name identification may be performed by user authentication through video call, or may be performed using the result of user authentication identified when an access medium (for example, OTP or check card) is transferred to the user on offline. Also, the secondary real name identification may be performed by user authentication through video call, may be performed using the result of user authentication identified when the access medium is transferred to the user on offline, or may be performed using the corresponding user's existing account.

Also, in the aforementioned embodiment, if the primary real name identification and the secondary real name identification are all completed, an account is opened. However, in the modified embodiment, in addition to the primary real name identification and the secondary real name identification, a result of user authentication identified using a mobile phone, an accredited certificate or i-PIN or an authentication result of a credit information service company may additionally be used.

Meanwhile, in the first embodiment, the access management device 120 may perform membership subscription by directly receiving information for user authentication. In the first embodiment, the access management device 120 may perform membership subscription through interaction with other application without directly receiving information for user authentication.

If the access management device 120 performs membership subscription in accordance with the first embodiment, the access management device 120 sets login information in the membership subscription step. However, if the access management device 120 performs membership subscription in accordance with the second embodiment, login information including PIN number and the user's login means is not set. Therefore, the account opening device 160 according to the present disclosure may allow login information to be set through the login unit 124 shown in FIG. 2.

In this embodiment, the login unit 124 shown in FIG. 2 may together set login information including PIN number and the user's login means by interacting with the banking business management server 2000 before opening an account with respect to the user who has performed membership subscription through the access management device 120 in accordance with the second embodiment. The process of setting login information by the login unit 124 by interacting with the banking business management server 2000 has been described in the portion of the login unit 124 shown in FIG. 2 and therefore its detailed description will be omitted.

Meanwhile, the account information setting unit 163 and the real name identifier 165 may perform the process for opening an account in accordance with the user's account opening request as described above, and may store information input by the user in the process of opening an account by interacting with the banking business management server 2000. For example, the user may sequentially perform account opening by using an account opening pages displayed through the agent 100. In this case, if the user should repeatedly input information required for account opening when the agent 100 is re-executed after being terminated, this repeated information input may cause the user's inconvenience. Here, the agent 100 is re-executed after being terminated when no action is sensed on the agent 100 for a certain time period due to another task performed during performing account opening task, the user terminal 1000 enters a shade zone, or a battery of the user terminal 1000 is run out, Therefore, in the embodiment of the present disclosure, the information input by the user may be stored in the banking business management server 2000 as temporary information until account opening is terminated. If the agent 100 is re-executed, the user may perform account opening by using the temporary information input until the agent 100 is terminated.

For example, as described above, since the account information setting unit 163 and the real name identifier 165 receive information required for account opening from the user while sequentially displaying account opening pages, if the agent 100 is re-executed after being terminate, the agent 100 may display next page of a page finally stored in the banking business management server 2000 to allow the user to subsequently perform account opening. At this time, the page completely input by the user may be matched with the user's membership subscription information or login information and then stored in the banking business management server 2000. Therefore, if the agent 100 is re-executed after being terminated, the agent 100 may receive membership subscription information or login information from the user to extract information on the page completely input by the user.

Figure 7:
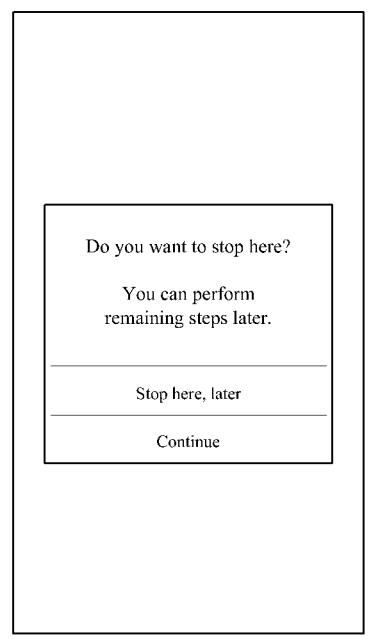
FIG. 7 is a view illustrating a page identifying whether a user stops running of a banking business processing application according to the embodiment of the present disclosure.
Figure 8:
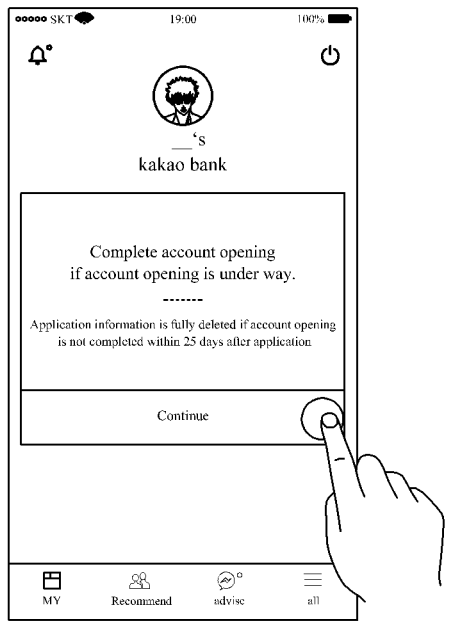
FIG. 8 is a view illustrating a page for selecting re-execution of account opening through a banking business processing application according to the embodiment of the present disclosure.

FIG. 7 is a view illustrating a page identifying whether a user stop running of the agent according to the embodiment of the present disclosure, and FIG. 8 is a view illustrating a page for selecting re-execution of account opening through the agent according to the embodiment of the present disclosure.

In the embodiment of the present disclosure, if a manipulation for stop running of the agent 100 is sensed from the user, the agent 100 and the banking business management server 2000 may display a page for identifying whether the user stops running of the agent 100 as shown in FIG. 7. At this time, a guide expression indicating that an account opening process which is not performed may be performed later may be provided through the page for identifying whether the user stop running of the agent 100.

Afterwards, if the user re-executes the agent 100, the agent 100 and the banking business management server 2000 may provide a page for selecting re-execution of account opening as shown in FIG. 8.

For example, the user may desire to stop running of the agent 100 as the user has no intention for account opening. Even in this case, if information input by the user is stored, it may be a waste of a storage space. Therefore, if the user stops running of the agent 100 and re-executes the agent 1000 while the user is performing account opening through the agent 100, the banking business management server 2000 and the agent 100 may provide the page shown in FIG. 8 to confirm whether the user re-performs the account opening process, whereby consumption of an unnecessary storage space may be avoided.

However, if the agent 100 is terminated by occurrence of an error such as communication failure, since it has no relation with the user's intention, it is desirable that the agent 100 and the banking business management server 2000 store the information input by the user page by page.

Hereinafter, a detailed configuration of the interest management device 180 will be described with reference to FIG. 9.

As shown in FIG. 9, the interest management device 180 may include a payable interest information acquisition unit 183, a reference time computation unit 186, and a real-time interest display unit 187.

The payable interest information acquisition unit 183 acquires information on a payable interest to be paid to a corresponding account at a preset interest payment date based on a deposit residual and an interest rate of the account. For example, the payable interest information acquisition unit 183 may acquire information on a payable interest to be paid to the account at the preset interest payment date from the banking business management server 2000. However, since the present disclosure is not limited to this case, the payable interest information acquisition unit 183 may acquire account information such as a deposit residual and an interest rate of the account from the banking business management server 2000, and may acquire information on a payable interest by directly computing the payable interest based on the acquired account information.

The reference time computation unit 186 computes a reference time required to deposit the preset reference amount. The reference amount may be set to a minimum amount of an interest displayed through the real-time interest display unit 187. For example, if the real-time interest display unit 187 displays an expectation interest on a basis of 0.01 won, the reference time computation unit 186 may compute the reference time required to deposit 0.01 won. The reference time computation unit 186 may compute the reference time required to deposit the reference amount based on the account information acquired through the account information acquisition unit 181. For example, the reference time computation unit 186 may compute the payable interest to be paid to the account at the interest payment date based on the deposit residual and the interest rate of the account, and may compute the reference time by dividing the time to the interest payment date in accordance with the ratio between the payable interest and the reference amount. Therefore, the more the deposit residual of the account is and the higher the interest rate is, the shorter the reference time is computed.

The real-time interest display unit 187 displays an expectation interest to be accumulated from the opening data of the account to the current time, in real time.

The real-time interest display unit 187 may display an expectation interest computed by a value obtained by accumulating the reference amount whenever the reference time passes from the opening data of the account. As described above, since the reference time is computed to be shorter if the deposit residual of the account is more and the interest rate of the account is higher, the expectation interest is displayed by being changed to a shorter period if the deposit residual of the account is more and the interest rate of the account is higher. The real-time interest display unit 187 may display the expectation interest in real time by directly computing the expectation interest, but if the interest management device 180 further includes an element for computing real-time interest, the real-time display unit 187 may receive and display the expectation interest computed through the corresponding element.

As described above, since deposit times or interest calculating method may be varied depending on account types, the result computed through the reference time computation unit 186 and the result displayed through the real-time interest display unit 187 may be varied.

For example, A free deposit and withdrawal account is an account type freely deposited or withdrawn by a user without the need of notice to a bank. Thus, if the type of account is a free deposit and withdrawal account, the reference time computed through the reference time computation unit 186 may be varied whenever deposit or withdrawal occurs. In detail, if deposit occurs, the reference time becomes shorter, and if withdrawal occurs, the reference time becomes longer. Therefore, the real-time interest display unit 187 displays the expectation interest in real time by accumulating the reference amount at a shorter period if deposit occurs and accumulating the reference amount at a longer period if withdrawal occurs. Since the free deposit and withdrawal account may be a demand account but is not limited thereto, the free deposit and withdrawal account may be a deferred deposit account in which an intermediate deposit and withdrawal function is set, or an accumulative deposit account in which an intermediate deposit and withdrawal function is set.

Also, since the intermediate withdrawal available account is an account in which intermediate withdrawal is available by the user even before the account expires, if the type of account is an intermediate withdrawal available account, the reference time computed through the reference time computation unit 186 becomes longer whenever withdrawal occurs. Therefore, the real-time interest display unit 187 displays the expectation interest in real time by accumulating the reference amount at a longer period whenever intermediate withdrawal occurs in the intermediate withdrawal available account. The intermediate withdrawal available account may be, but not limited to, a deferred deposit account in which an intermediate withdrawal function is set or an accumulative deposit account in which an intermediate withdrawal function is set.

Also, since a periodic deposit occurrence account is an account in which an interest may get paid for a certain period at the cost of a certain amount periodically deposited in the account for a given period, if the type of account is a periodic deposit occurrence account, the reference time computed through the reference time computation unit 186 becomes shorter whenever deposit occurs. Therefore, the real-time interest computation unit 187 displays the expectation interest in real time by accumulating the reference amount at a shorter period whenever deposit occurs in the periodic deposit occurrence account.

However, since the interest rate may be varied per deposit period in case of the periodic deposit occurrence account, the reference time computation unit 186 may compute the reference time by reflecting a deposit amount per deposit period and an interest rate corresponding to the corresponding deposit period. Particularly, in case of the account set to be lower interest rate per deposit period, the reference time computed through the reference time computation unit 186 may be longer as deposit occurs. The periodic deposit occurrence account may be an accumulative deposit account but is not limited thereto.

Also, deposit may occur in the aforementioned deposit occurrence account non-periodically at the user's desired time. In this case, the reference time computed through the reference time computation unit 186 becomes shorter whenever deposit occurs. Therefore, the real-time interest computation unit 187 displays the expectation interest in real time by accumulating the reference amount at a shorter period per deposit time of an aperiodic deposit occurrence account.

Therefore, the agent 100 according to the present disclosure may display the expectation interest to be accumulated to the current time separately from the time when actual interest is to be paid, whereby the user may feel pleasure by identifying the interest occurred on the corresponding account in real time.

Also, in the aforementioned description, if deposit or withdrawal occurs, the agent 100 according to the present disclosure displays the expectation interest computed by the accumulated value of the reference amount, in real time whenever the reference time changed by the occurrence of the corresponding deposit or withdrawal, but the present disclosure is not limited thereto.

Therefore, the real-time interest display unit 187 may display the expectation interest in real time based on the previously reference time for a predetermined time from the time when deposit or withdrawal occurs, and may display the expectation interest in real time based on the changed reference time after the predetermined time passes.

For example, the real-time interest display unit 187 may display the expectation interest in real time by accumulating the reference amount whenever the previously reference time passes from the time when deposit or withdrawal has occurred to 0 o'clock of next day of the day when deposit or withdrawal has occurred, and may display the expectation interest in real time by accumulating the reference amount whenever the changed reference time passes from 0 o'clock of next day.

The real-time interest display unit 187 may reset the expectation interest if the expectation interest until the interest payment date is paid to the account through the banking business management server 2000, and may newly compute and display the expectation interest from the interest payment date. That is, since there is an account, in which an interest payment date reaches several times before expiration, depending on account types, the real-time interest display unit 187 may compute and display the expectation interest, which is not paid, in real time, except the interest actually paid at the interest payment date.

Also, the agent 100 and the banking business management server 2000 according to the present disclosure may display the expectation interest to be accumulated to the current time in real time and pay settlement interest to the account even before the interest payment date.

To this end, if the settlement request of the user that satisfies a predetermined condition is received, the real-time interest display unit 187 may transmit the expectation interest computed until the current time when the settlement request is received, to the banking business management server 2000. The banking business management server 2000 may settle the interest at the user's desired time by paying the received expectation interest to the account.

In one embodiment, the predetermined condition may be set using at least one of an account maintenance period, a set amount of the account, and a customer rating. For example, if the period when the account has been maintained from the opening date of the account to the current time in comparison with the expiration date exceeds 50%, a set amount of the account corresponds to a large amount exceeding a certain amount, or the corresponding user corresponds to a user of a certain rating or more, the agent 100 and the banking business management server 2000 may settle and pay an interest at an intermediate period in accordance with a request of the corresponding user. However, since the present disclosure is not limited to this case, information which is not described in the aforementioned description may be used as a condition for settling an interest at an intermediate period.

In the aforementioned embodiment, the predetermined condition is set using at least one of the account maintenance period, the set amount of the account, and the customer rating, but the present disclosure is not limited thereto. The condition may be set using another information if necessary.

Even in the case that the expectation interest is settled and paid to the account, the real-time interest display unit 187 may reset the expectation interest and newly compute and display the expectation interest from the interest settlement date.

Figure 10:
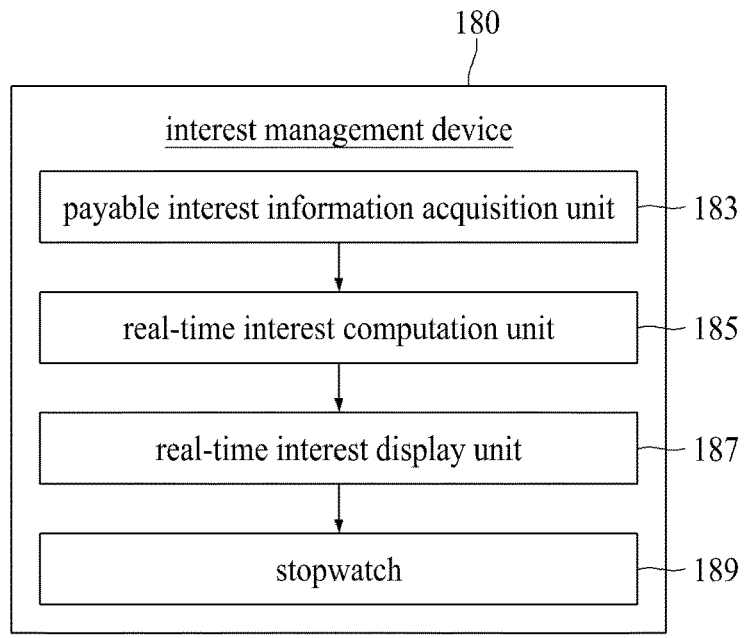
FIG. 10 is a detailed view illustrating an interest management device of a banking business processing application according to another embodiment of the present disclosure.

FIG. 10 is a detailed view illustrating an interest management device of a banking business processing agent according to another embodiment of the present disclosure.

As shown in FIG. 10, the interest management device 180 may include a payable interest information acquisition unit 183 and a real-time interest display unit 187, and may further include a real-time interest computation unit 185 and a stopwatch 189. Since the payable interest information acquisition unit 183 may operate in the same manner as that of FIG. 9, its repeated description will be omitted.

The real-time interest computation unit 185 computes an expectation interest to be accumulated from the opening date of the account to the current time. The real-time interest computation unit 185 may compute a reference interest to be accumulated for a predetermined time and compute the expectation interest by accumulating the reference interest whenever the corresponding time passes. In one embodiment, the predetermined time may be set to a minimum time measured through the stopwatch 189. For example, if the time is measured through the stopwatch 189 on a basis of 0.01 second, the real-time interest computation unit 185 may compute the reference interest to be accumulated for 0.01 second, and may compute the reference interest by accumulating the reference interest whenever 0.01 second passes. Therefore, the real-time interest computation unit 185 may compute the expectation interest to be accumulated by operating to be synchronized with the stopwatch 189.

Meanwhile, since reference interest is increased if there is a lot of deposit residual in the account and an interest rate is high, more expectation interest is accumulated for a predetermined time if there is a lot of deposit residual in the account and the interest rate is high. Therefore, the real-time interest computation unit 185 may compute the expectation interest to be accumulated by newly computing the reference interest by reflecting deposit or withdrawal occurring in the account.

The real-time interest display unit 187 displays the expectation interest to be accumulated from the opening date of the account to the current time in real time. In one embodiment, the real-time interest display unit 187 may operate by being synchronized with the stopwatch 189. In this embodiment, the real-time interest display unit 187 may display the expectation interest corresponding to a passage time from the opening date of the account to the current time. At this time, the passage time is measured through the stopwatch 189 in real time. The real-time interest display unit 187 may display the expectation interest in real time by directly computing the expectation interest, but the present disclosure is not limited thereto. Therefore, the real-time interest display unit 187 may receive and display the expectation interest computed through the real-time interest computation unit 185.

If deposit or withdrawal occurs in the account, the real-time interest display unit 187 may display the expectation interest computed by accumulating the reference interest changed from the time when the corresponding deposit or withdrawal occurs.

However, since the present disclosure is not limited to the above case, the real-time interest display unit 187 may display the expectation interest in real time based on the previously computed reference interest change for a predetermined time from the time when deposit or withdrawal occurs, and may display the expectation interest in real time based on the changed reference interest after the predetermined time passes.

For example, the real-time interest display unit 187 may display the expectation interest in real time by accumulating the previously computed reference interest from the time when deposit or withdrawal occurs to 0 o'clock of next day of the day when deposit or withdrawal occurs, and may display the expectation interest in real time by accumulating the changed reference interest from 0 o'clock of next day.

The stopwatch 189 is an element for exactly measuring time on a basis of accurate unit. For example, the stopwatch 189 may measure the time on a basis of 0.01 second from the opening date of the account. The real-time interest display unit 187 may display the expectation interest until the current time by computing the reference interest to be accumulated on a basis of a minimum time measured through the stopwatch 189 by being synchronized with the stopwatch 189.

Although FIG. 10 illustrates that the stopwatch 189 is included in the agent 100 according to the present disclosure, the present disclosure is not limited to the example of FIG. 10. For example, instead of the stopwatch 189, another element that may determine whether a predetermined time has passed may be included in the agent 100. For another example, if the user terminal 1000 includes an element that may determine whether a predetermined time has passed, the agent 100 may be synchronized with the corresponding element included in the user terminal 1000 and may operate by receiving the time measured from the account opening date.

Also, in the aforementioned description, if deposit or withdrawal occurs, the agent 100 according to the present disclosure displays the expectation interest in real time, which is computed by the accumulated value of the reference amount whenever the reference time changed in accordance with the corresponding deposit or withdrawal passes, but the present disclosure is not limited thereto.

The real-time interest display unit 187 may reset the expectation interest if the expectation interest until the interest payment date is paid to the account through the banking business management server 2000, and may newly compute and display the expectation interest from the interest payment date. That is, since there is an account, in which an interest payment date reaches several times before expiration, depending on account types, the real-time interest display unit 187 may compute and display the expectation interest, which is not paid, in real time, except the interest actually paid at the interest payment date.

Also, the agent 100 and the banking business management server 2000 according to another embodiment of the present disclosure may pay settlement interest to the account before the interest payment date in accordance with a request of the user who satisfies a predetermined condition. Since this embodiment has been described in detail through FIG. 9, its repeated description will be omitted.

The banking business management server 2000 processes the user's banking business request through the agent 100. The banking business management server 2000 may manage the user's information for using the agent 100.

Hereinafter, a detailed configuration of the banking business management server 2000 will be described with reference to FIG. 11.

Figure 11:
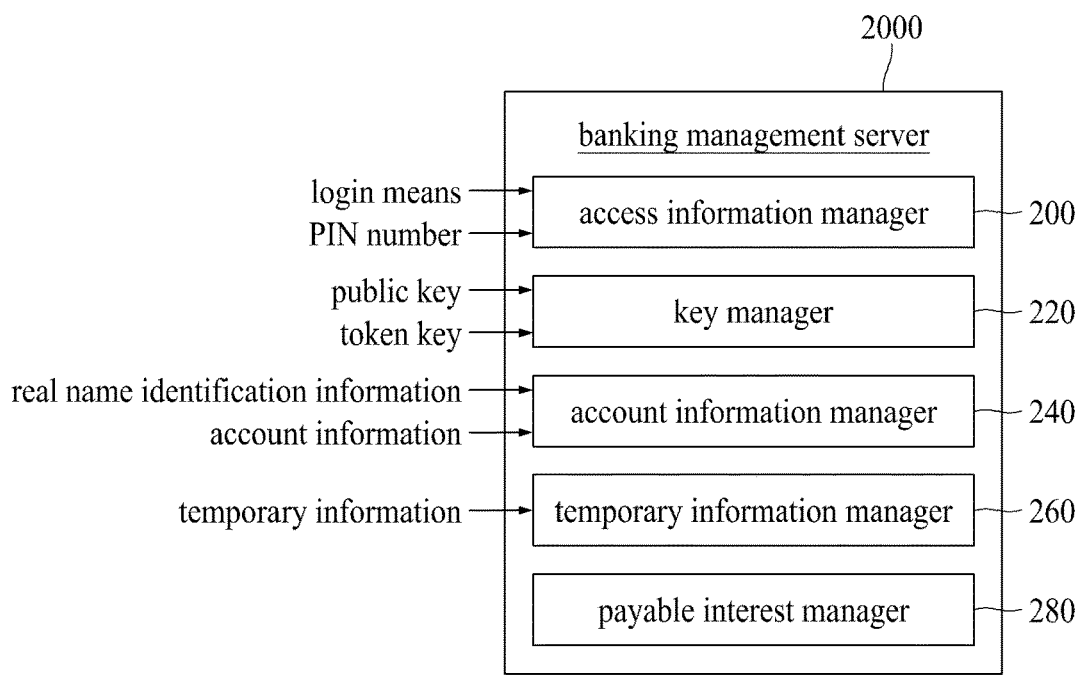
FIG. 11 is a detailed view illustrating a banking business management server according to the embodiment of the present disclosure.

As shown in FIG. 11, the banking business management server 2000 may include an access information manager 200, a key manager 220, an account information manager 240, a temporary information manager 260, and a payable interest manager 280.

The access information manager 200 manages login information for the user's access to the agent 100. The login information may include a login means that may include pattern information to which keys on a keypad are connected, biometric information such as fingerprint/face/iris, and a certificate password. The access information manager 200 may receive and set the login means input by the user for membership subscription from the access management device 120. Therefore, the access information manager 200 may determine whether to allow the user to access the agent 100 by comparing the login means input to the access management device 120 by the user for login with a preset login means.

The access information manager 200 may receive and set a PIN number from the access management device 120 as a banking business authentication means input by the user for membership subscription. Therefore, the access information manager 200 may determine whether to process a banking business requested by the user by comparing the PIN number input to the access management device 120 by the user with a preset PIN number to authenticate the PIN number.

The key manager 220 generates a token key if login information is set by interaction between the access information manager 200 and the access management device 120. The key manager 220 may transmit the generated token key to the access management device 120 through the access information manager 200 and manage the token key by matching the token key with the login information.

The key manager 220 may manage a certificate generated as the agent 100 is executed in the user terminal 1000. The certificate may include a public key and a private key. The key manager 220 may receive the public key from the access management device 120 and then manage the received public key. Therefore, the agent 100 and the banking business management server 2000 may perform encrypted communication by using the private key and public key, which are generated to be matched with each other. The key manager 220 may manage the public key by matching the public key with the login information, and may manage the public key and the token key by matching them with the login information.

The account information manager 240 opens an account desired by the user by interacting with the account opening device 160. The account information manager 240 may manage account information of the opened account. The account information manager 240 may manage information input from the user to open the account. For example, the account information manager 240 may manage the user's real name identification information, information on the opened account, etc. The real name identification information may include ID card information including ID card which is captured, and the user's other bank account information. The account information may include a deposit residual of the account, a subscription period and an interest rate.

The account information manager 240 may perform the secondary real name identification by using the user's other bank account information by interacting with the account opening device 160. For example, the account information manager 240 may identify whether an owner of other bank account corresponding to other bank account number is matched with the corresponding user's real name, based on other bank name and other bank account number, which are input to the account opening device 160. The account information manager 240 may deposit a predetermined amount to other bank account number if the other bank account is owned by the user, and may write identification information including at least one of a predetermined text and a predetermined number in the name of a depositor. The account information manager 240 may receive the identification information written in the name of the depositor from the user through the account opening device 160 and complete the secondary real name identification for the user who has input the same identification information as the written identification information.

The account information manager 240 may guide, for a user who has completed the secondary real name identification, that account opening application has been completed, and may open an account if the primary real name identification is completed. The account information manager 240 may determine whether the primary real name identification has been completed by receiving the result of truth identification of the ID card determined by the external entity.

The temporary information manager 260 manages information input by the user until the account is completely opened, as temporary information. For example, if the account is completely opened by an account opening request of a specific user, since information input by the user to open the account may be stored to correspond to login information of the corresponding user as a base for opening the corresponding account, the temporary information means information input by the user until the account is completely opened.

The temporary information manager 260 may sequentially store information input in an account opening pages by the user page by page in the process of opening an account through interaction between the agent 100 and the account information manager 240. For example, if the user should repeatedly input information required for account opening when the agent 100 is re-executed after being terminated on the grounds that no action is sensed on the agent 100 for a certain time period due to another task during performing account opening, the user terminal 1000 enters a shade zone, or a battery of the user terminal 1000 is run out, this repeated information input may cause the user's inconvenience. Therefore, the account information manager 240 may continue to open an account by using temporary information stored in the temporary information manager 260 when the agent 100 is re-executed after being terminated before account opening is completed.

For example, since the account information manager 240 may sequentially display a plurality of account opening pages for receiving information required for account opening through the account opening device 160, the temporary information manager 260 may sequentially store pages completely input by the user among the plurality of account opening pages. At this time, the temporary information manager 260 may match the completely input pages with membership subscription information or login information of the user who is performing account opening and then store the matched pages. Therefore, since the temporary information manager 260 finally stores a page where the user has finally input information, among various pages displayed for the user to open the account, the account information manager 240 may easily extract a page to be displayed to continue account opening if the agent 100 is re-executed after being terminated before account opening is completed.

The temporary information manager 260 may store the page input by the user after login information is set by interaction with the access management device 120 and thus the token key is generated, as temporary information. For example, the temporary information manager 260 may store the page where information such as CDD, EDD, and FATCA is input if the agent 100 is terminated in a state that the user inputs information such as CDD, EDD and FATCA after the token key is generated. Therefore, the account information manager 240 may guide for user to continue to open an account by displaying a page after the page stored when the agent 100 is re-executed.

In this way, the temporary information manager 260 stores temporary information after the token key is generated. This is because that the temporary information manager 260 preferably stores the temporary information only in a state that the agent 100 and the banking business management server 2000 may safely manage the user's information. That is, as described above, since the token key is generated as a unique value per agent 100, generation of the token key means that information of the user who uses each agent 100 may be protected as unique information. Also, since the token key is generated after the user's login information is set, the temporary information may be matched with the login information and then stored.

Therefore, the temporary information manager 260 according to the present disclosure may store temporary information by matching the temporary information with login information only after the token key is generated, whereby the information input by the user may safely be protected. Also, as the temporary information manager 260 stores the temporary information only after the token key is generated, the banking business management server 2000 according to the present disclosure may more improve data storage efficiency than the case that all data are stored.

In the aforementioned embodiment, the temporary information manager 260 stores the temporary information by matching the temporary information with login information only after the token key is generated. In another embodiment, the temporary information manager 260 may store the temporary information after the certificate is generated through the access management device 120.

The payable interest manager 280 computes payable interest to be paid to the account at the interest payment date based on the account information. As described above, the account information may include an account type, a deposit residual, a subscription period, and an interest rate. The account type may be any one of a deferred deposit account, a demand account, and an accumulative deposit account. The subscription period may include an expiration period of the account, and information on payment date of pre-agreed interest.

As described above, the account may be any one of a deferred deposit account, a demand account, and an accumulative deposit account, and deposit times or interest calculating method may be varied depending on account types.

For example, since the deferred deposit account is an account in which an interest may get paid for a certain period at the cost of a certain amount periodically deposited in the account for a given period, if the account is a deferred deposit account, the payable interest manager 280 may compute an interest to be paid to the account at an expiration date of the deferred deposit account as a payable interest.

Also, since the demand account is a free deposit and withdrawal account in which a user may freely perform deposit or withdrawal without notice to a bank, if the account is a demand account, the payable interest manager 280 may change the payable interest by reflecting a deposit amount or a withdrawal amount whenever deposit or withdrawal occurs. For example, the payable interest manager 280 may increase a payable interest by reflecting a deposit amount if deposit occurs, and may reduce a payable interest by reflecting a withdrawal amount if withdrawal occurs. A detailed computing method of a payable interest may be determined in accordance with predetermined terms and conditions.

Also, the accumulative deposit account is an account in which an interest may get paid for a certain period at the cost of a certain amount periodically deposited in the account for a given period. Since the accumulative deposit account is an account in which an interest rate may be varied per deposit period, if the account is an accumulative deposit account, the payable interest manager 280 may change the payable interest by reflecting a deposit amount per deposit period of the accumulative deposit account and an interest rate corresponding to the corresponding deposit period.

Meanwhile, in the aforementioned embodiment, the agent 100 receives information on the payable interest computed by the payable interest manager 280 of the banking business management server 2000 and computes the expectation interest to be deposited at the current time in accordance with the payable interest. However, in another embodiment, the agent 100 may directly compute the payable interest. In this embodiment, the payable interest information acquisition unit 183 of the agent 100 may acquire account information such as deposit residual and interest rate of the account from the banking business management server 2000 and directly compute the payable interest based on the acquired account information.

The payable interest manager 280 may settle an interest before an interest payment date and pay the settled interest to the account. To this end, the payable interest manager 280 may receive the user's settlement request from the agent 100 and determine whether the corresponding user corresponds to a user who satisfies a predetermined condition that may request settlement. The payable interest manager 280 may receive a expectation interest from the agent 100 if the corresponding user is a user who satisfies a predetermined condition, and may pay the received expectation interest to the account as a settlement interest. Therefore, the expectation interest accumulated until a desired time of the user who has satisfied the predetermined condition may be settled to acquire the settlement interest in addition to the deposit residual, whereby the user's pleasure in using the account may be improved in the present disclosure.

Meanwhile, although not shown in FIG. 11, the banking business management server 2000 may further include a customer information file generator (not shown) that generates a customer information file. The customer information file generator generates a customer information file of the corresponding user in accordance with a customer information file generation request transferred from the customer information file generation request device 140.

In detail, if the customer information file generation request including customer information is received from the customer information file generation request device 140, the customer information file generator determines whether the corresponding user is a user who can open an account, based on the corresponding customer information. For example, the customer information file generator determines whether a corresponding age corresponds to an age that may open an account and whether the user's name is matched with the resident registration number based on the user's name and resident registration number included in the customer information. As a result, the customer information file generator determines whether the corresponding user is a user who can open an account, and if the corresponding user is a user who can open an account, the customer information file generator may generate a customer information file for the corresponding user.

In another embodiment, the customer information file generator may generate a customer information file by using other customer information (for example, foreigner registration number, information as to a guardian's consent, or a guardian's resident registration number) other than a resident registration number or name required for generation of the customer information file, in case of a user who has a difficulty in generating a customer information file, such as foreigner or minor.

Hereinafter, the account opening method based on the banking business processing agent according to the present disclosure will be described in detail. The account opening method based on the agent according to the embodiment of the present disclosure may be embodied by the banking business processing system that includes the aforementioned banking business processing agent and banking business management server.

Figure 12:
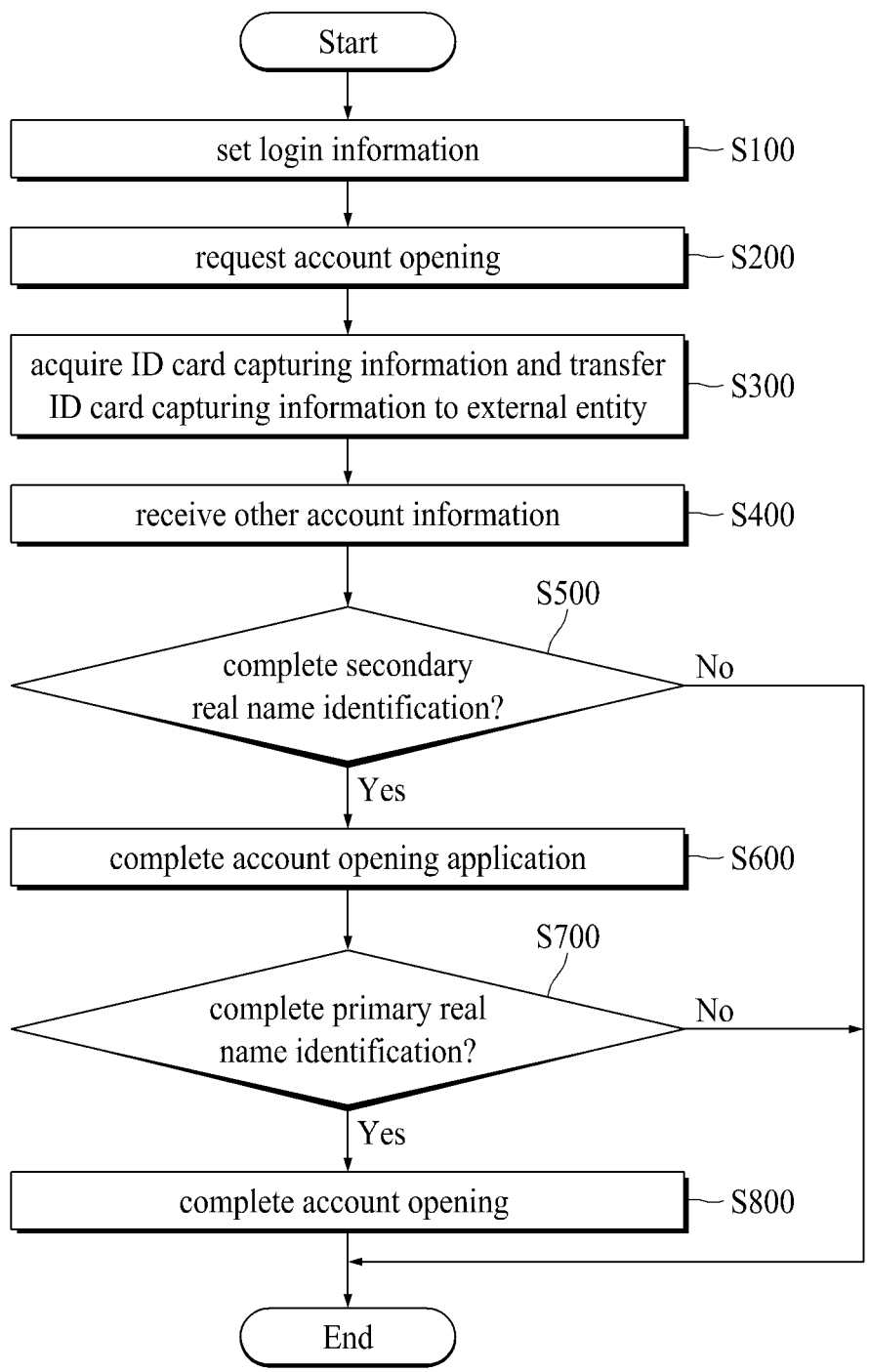
FIG. 12 is a flow chart briefly illustrating an account opening method according to the embodiment of the present disclosure.

FIG. 12 is a flow chart briefly illustrating an account opening method according to the embodiment of the present disclosure.

As shown in FIG. 12, if an account opening request is received from a user who has completed membership subscription (S200), the agent 100 may acquire the user's ID card image including an ID card which is captured and transfers the corresponding ID card image to the external entity (S300), whereby the agent 100 requests the external entity of truth identification of the ID card for the primary real name identification of the user.

Next, the agent 100 receives other bank account information from the user for the secondary real name identification (S400). The other bank account information may include other bank name and other bank account number to allow the user to process a banking business.

Particularly, in the embodiment of the present disclosure, the step S400 may be performed subsequently to the step S300. That is, in the embodiment of the present disclosure, other bank account information may be received before the primary real name identification is completed and thus, other bank account information may be received regardless of reception of the result of truth identification. Therefore, in the embodiment of the present disclosure, the user's inconvenience that the user should be on standby unnecessarily until the primary real name identification is completed as truth identification of the ID card is delayed.

Next, the agent 100 performs the secondary real name identification for the user by using the other bank account information (S500), and guides, to the user, that account opening application has been completed if the secondary real name identification is completed (S600).

On the other hand, if the secondary real name identification is not completed in the step S500, since it may not be considered that the other bank account information is set by the user, the agent 100 may guide to the user that account opening is not available.

Next, if the result of truth identification of the ID card is received from the external entity, the agent 100 performs the primary real name identification in accordance with the corresponding result (S700), and guides to the user that account opening has been completed if the primary real name identification is completed (S800).

On the other hand, if the primary real name identification is not completed in the step S700, since the ID card is not valid, the agent 100 may guide to the user that account opening is not available.

Although not shown, if the primary real name identification and the secondary real name identification are completed, the agent 100 may identify whether a user who intends to open an account corresponds to a user who has set login information, by additionally receiving body information or PIN number from the user.

To this end, in the embodiment of the present disclosure, the agent 100 may set a login information including a login means and PIN number before the step S200 (S100). Here, the login means includes pattern information and biometric information.

In this way, in the embodiment of the present disclosure, the agent 100 may maintain security capability that may be vulnerable in the process of identifying the user's real name in an untact manner, at the same level as that of a contact manner by certifying the user through a plurality of real name identification processes.

Hereinafter, the primary real name identification process based on the ID card during opening an account in accordance with the embodiment of the present disclosure will be described in detail with reference to FIG. 13.

Figure 13:
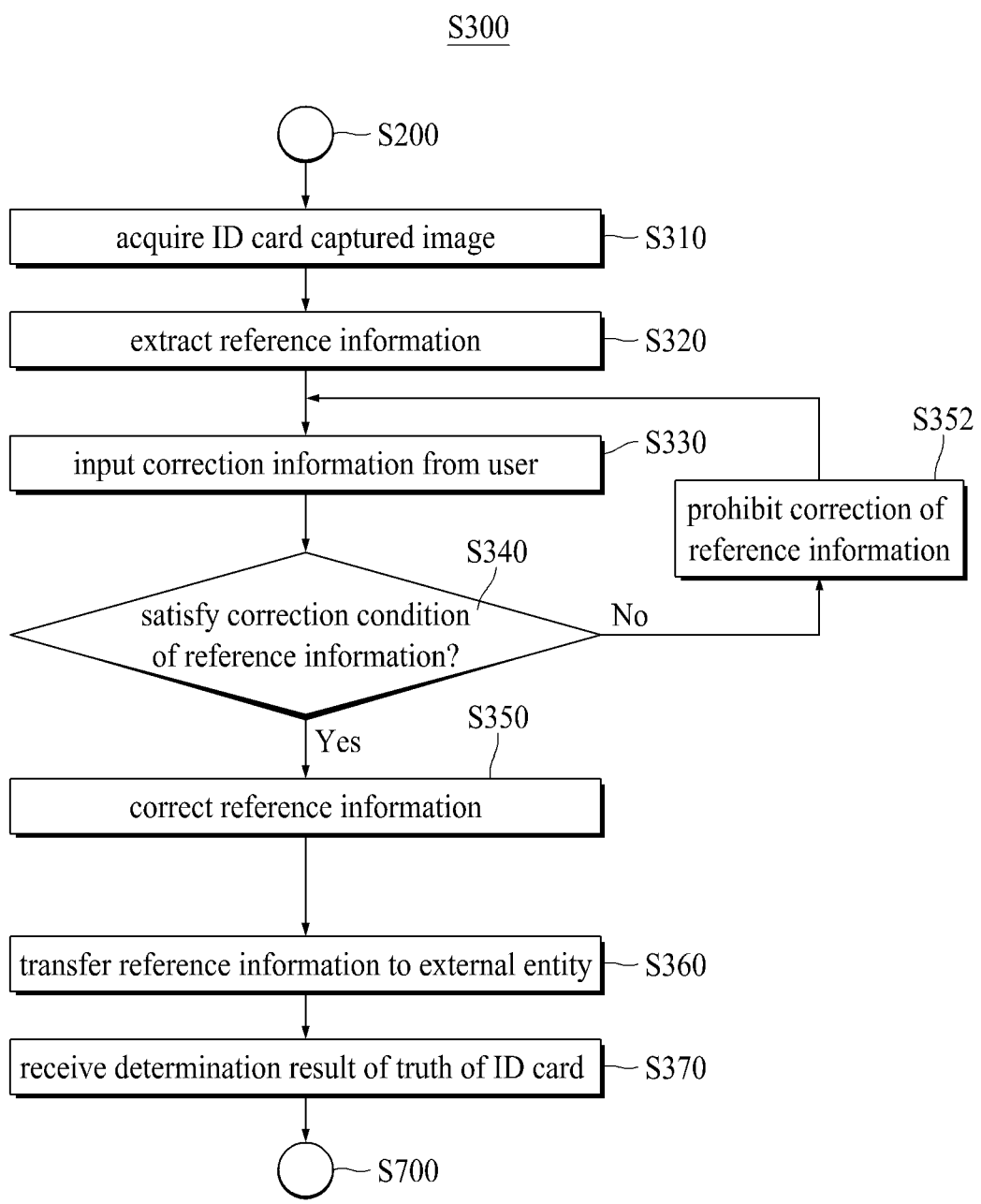
FIG. 13 is a flow chart briefly illustrating a primary real name identification process using an ID card during opening an account in accordance with the embodiment of the present disclosure.

As shown in FIG. 13, if an account opening request is received (S200), the agent 100 acquires an ID card image which is captured (S310).

Next, the agent 100 extracts reference information from the acquired ID card image (S320). The reference information means information that may identify the user's identity from the ID card, and may include name, resident registration number and issue date. Since a position where the reference information is written is determined in accordance with the ID card, the agent 100 may extract the above reference information by identifying text or number written in the determined position of the acquired image.

Next, the agent 100 transfers the extracted reference information to the external entity (S360) and receives the determined result of truth identification of the ID card from the external entity (S370). As a result, the agent 100 may determine whether the primary real name identification has been completed (S700).

In the embodiment of the present disclosure, after the step of S320, the agent 100 may receive correction information on the reference information extracted from the user (S330). For example, since an error may occur in the extracted reference information on the ground that the captured image quality is varied depending on capability of a camera for capturing ID card or a peripheral environment near the captured ID card, the agent 100 may allow the user to correct the reference information by receiving correction information.

However, if correction of the reference information is permitted without limitation, an invalid user may capture a random ID card and correct the reference information. Therefore, the agent 100 compares correction information corrected by the user with the extracted reference information (S340). The agent 100 permits correction of the reference information (S350) if the correction information satisfies a correction condition of the reference information. The agent 100 prohibits correction of the reference information (S352) if the correction information does not satisfy the correction condition of the reference information. If correction of the reference information is prohibited in accordance with S352, the current step returns to S330, whereby the agent may again receive the correction information from the user. Although FIG. 13 shows that the current step returns to S330 and thus the agent again receives the correction information if correction of the reference information is prohibited, in the modified embodiment, the current step may return to S310 and the agent may request the ID card to be captured again if correction of the reference information is prohibited in accordance with S352.

Meanwhile, the agent 100 may additionally use the user's name or resident registration number acquired in the process of collecting customer information or the process of identifying user identification based on a mobile phone, or customer information previously registered in case of an existing customer in addition to the extracted reference information.

In one embodiment, the agent 100 may determines whether to permit correction based on a ratio of the correction information to the extracted reference information. In this case, the ratio may be set by reflecting camera capability. For example, only in the case that the ratio of the correction information to the extracted reference information is set within 5%, correction may be permitted.

In another embodiment, the agent 100 may store text or number which is likely to be extracted in error as error information and determine whether to permit correction by determining whether the corrected reference information corresponds to error information. That is, the error information means information for matching text or number expected to be extracted in error with text or number included in specific reference information. For example, text 'kil' is likely to be extracted as 'kim' in error and number '0' is likely to be extracted as '8' in error. Therefore, since the agent 100 may permit correction only if the correction information corrected by the user corresponds to text or number corresponding to previously constructed error information, only the reference information that may be extracted in error may be corrected, whereby validity of untact real name identification may be improved.

The agent 100 may transfer the corrected reference information to the external entity in accordance with the determined result of the step S340 (S360).

Therefore, in the embodiment of the present disclosure, exactness of the reference information extracted from the captured ID card image may be improved, whereby reliability of the primary real name identification may be improved.

Hereinafter, a secondary real name identification process based on other bank account information during opening an account in accordance with the embodiment of the present disclosure will be described in detail with reference to FIG. 14.

Figure 14:
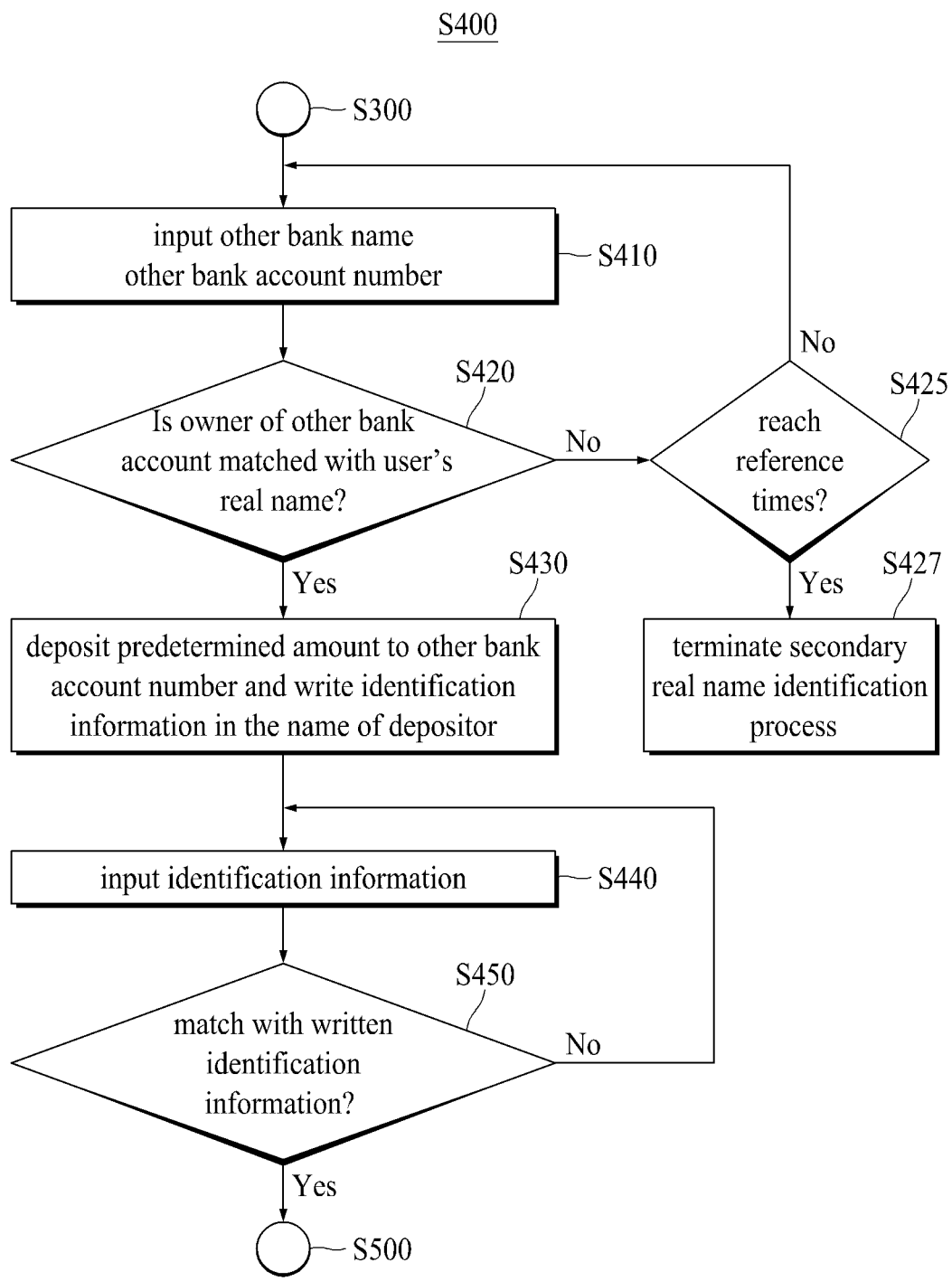
FIG. 14 is a flow chart briefly illustrating a secondary real name identification process using other bank account information during opening an account in accordance with the embodiment of the present disclosure.

As shown in FIG. 14, after transferring the captured ID card image to the external entity (S300), the agent 100 receives other bank account information including other bank name and other bank account number from the user (S410).

Next, if an owner of other bank account is matched with a real name of a user who has requested account opening (S420), the agent 100 deposits a predetermined amount to other bank account number and writes identification information including at least one of predetermined text or number in the name of a depositor (S430).

Meanwhile, if the owner of other bank account is not matched with the real name of the user who has requested account opening in the step of S420, the agent 100 returns to step S410 to again input other bank name and other bank account number. In this case, the agent 100 determines whether the number of times when the owner of the other bank is not matched with the real name of the user who has requested account opening reach predetermined reference times (S425). As a result, the agent 100 may return to S410 if the number of times does not reach predetermined reference times and the agent 100 may terminate the secondary real name identification if the number of times reaches predetermined reference times (S427).

Next, the agent 100 receives identification information from the user who has identified the other bank account (S440), and determines whether the identification information input by the user is matched with the written identification information (S450). Since the corresponding user may identify a predetermined text or number written in the other bank account by the real name identifier 165 only if the other bank account is a valid account opened by the corresponding user, the real name identifier 165 may simply complete the secondary real name identification in the above manner.

As a result of the step S450, if the identification information input by the user is matched with the written identification information, the agent 100 determines that the secondary real name identification is completed (S500).

Figure 15:
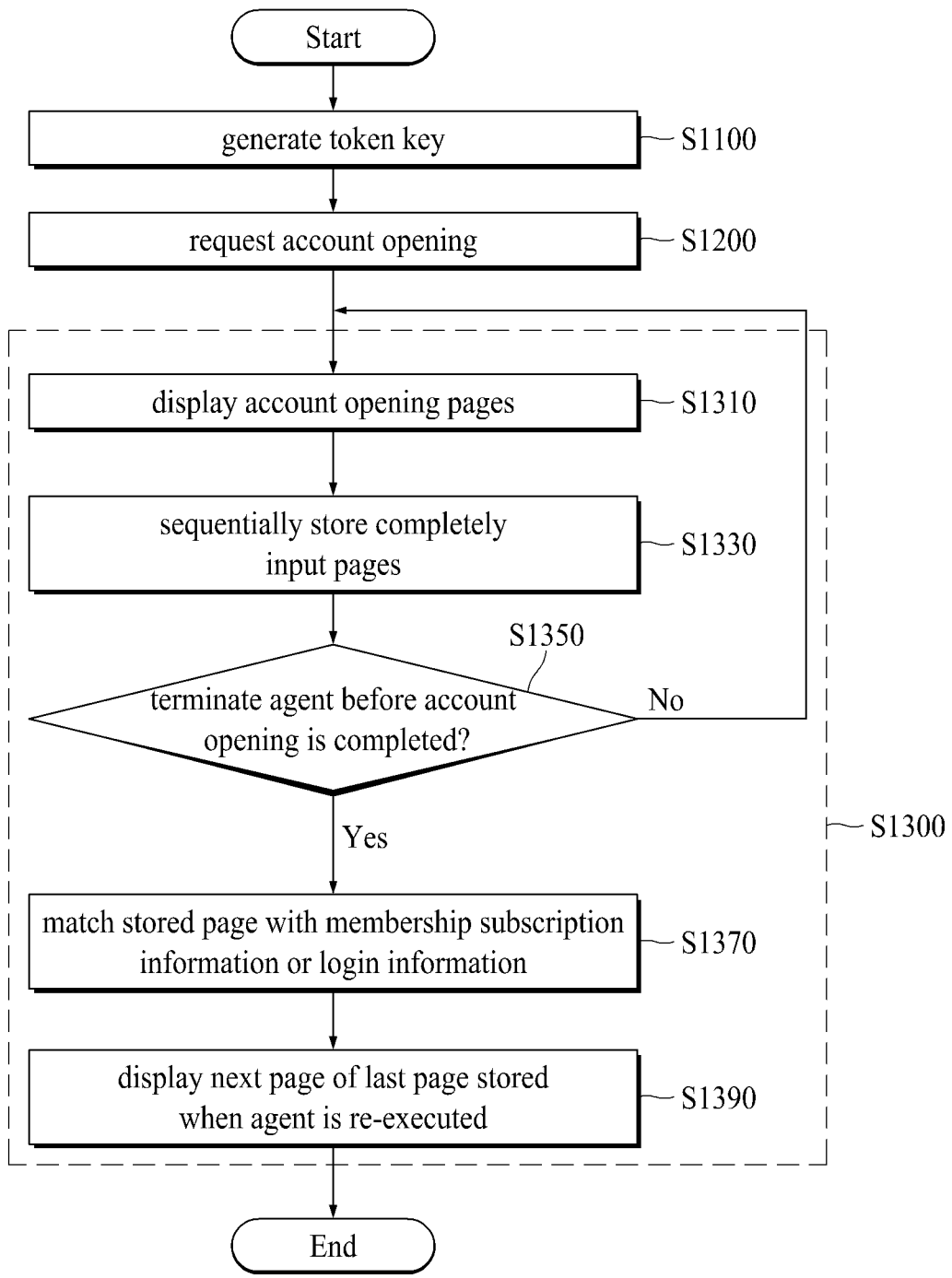
FIG. 15 is a flow chart illustrating a method for providing a service when an agent is terminated during opening an account according to one embodiment of the present disclosure.

FIG. 15 is a flow chart illustrating a method for providing a service when an agent is terminated during an account opening according to one embodiment of the present disclosure.

As shown in FIG. 15, if an account opening request is received from the user (S1200), the agent 100 and the banking business management server 2000 open an account by interaction (S1300).

In detail, in the embodiment of the present disclosure, the step S1300 of opening an account may be performed by including the following processes.

First of all, the banking business management server 2000 displays an account opening page for the user through the agent 100 (S1310). The account opening page may include a plurality of pages for guiding information required for account opening to the user or for receiving information required for account opening from the user.

In the step of S1310, a plurality of account opening pages may sequentially be displayed to guide information required for account opening to the user, and the information required for account opening is received. Account opening may be completed through the primary real name identification for ID card identification based on corresponding information and the secondary real name identification based on the other bank account information.

Next, the banking business management server 2000 sequentially stores the pages completely input by the user among the displayed account opening pages (S1330).

Next, if the agent 100 is terminated before account opening is completed (S1350), the banking business management server 2000 matches the finally stored page with membership subscription information or login information of the user who is performing account opening (S1370). At this time, termination of the agent 100 may include stop of the agent 100, which is not intended by the user, and stop of the agent 100, which is intended by the user, like the case that no action is sensed on the agent 100 for a certain time period due to another task, the user terminal 1000 enters a shade zone, or a battery of the user terminal 1000 is run out.

Therefore, in the embodiment of the present disclosure, if the agent 100 is terminated before account opening is completed, the page until the agent 100 is terminated is matched with the corresponding user's membership subscription information and managed, whereby information input until the agent 100 is terminated may be prevented from being deleted.

Next, if the agent 100 is re-executed, the banking business management server 2000 displays next page of the last page stored in the step S1330 (S1390).

Therefore, in the embodiment of the present disclosure, the user may perform account opening by using information previously input as it is without repeatedly inputting information required for account opening, whereby convenience in the account opening process including complicated steps may be improved.

Meanwhile the step S1350 of storing the page input by the user may be performed after the token key is generated (S1100). For example, the banking business management server 2000 may store the page where information such as CDD, EDD, and FATCA is input if the agent 100 is terminated in a state that the user inputs the information such as CDD, EDD and FATCA after the token key is generated. Therefore, the banking business management server 2000 may guide for the user to continue to open an account by displaying a page after the page stored when the agent 100 is re-executed.

In this way, the banking business management server 2000 stores the page input after the token key is generated. This is because that the agent 100 and the banking business management server 2000 preferably store the page including the user's information only in a state that the agent 100 and the banking business management server 2000 may safely manage the user's information. That is, as described above, since the token key is generated as a unique value per agent 100, generation of the token key means that information of the user who uses each agent 100 may be protected as unique information. Also, since the token key is generated after the user's login information is set, the temporary information may be matched with the login information and then stored.

In this way, in the embodiment of the present disclosure, if the agent 100 is terminated in the process of opening an account, the page input until the agent 100 is terminated may be stored and used when the agent 100 is re-executed, whereby the user's convenience may be improved in the process of identifying the user's real name in the untact manner.

Figure 16:
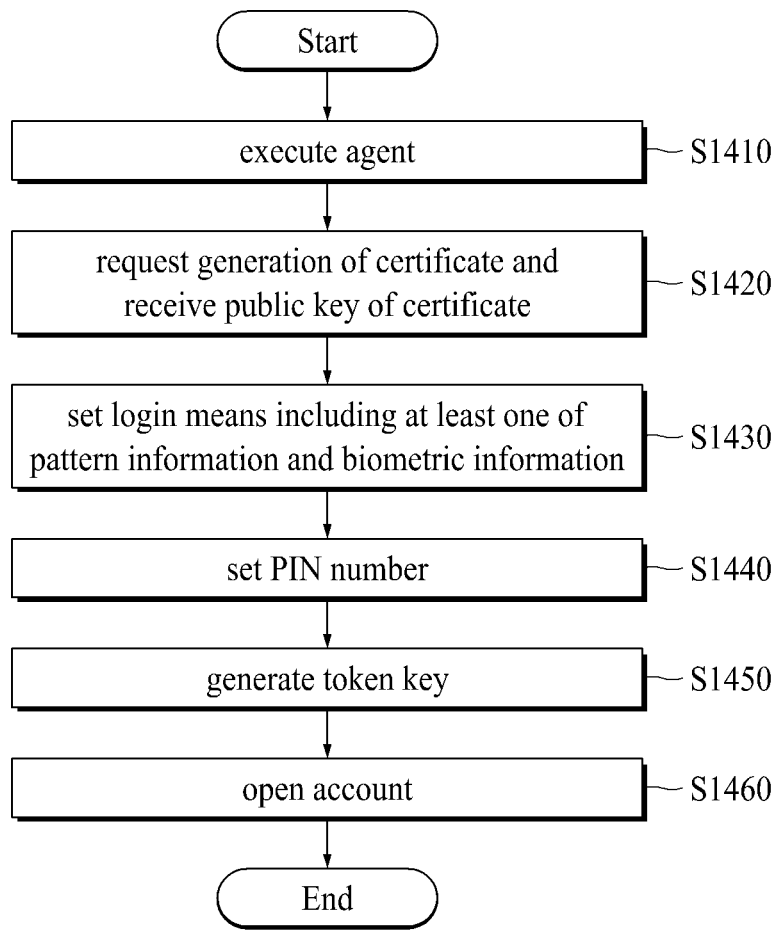
FIG. 16 is a flow chart briefly illustrating a method for driving a banking business processing application according to the embodiment of the present disclosure.

FIG. 16 is a flow chart briefly illustrating a method for driving an agent according to the embodiment of the present disclosure.

As shown in FIG. 16, if the agent 100 is executed (S1410), the agent 100 requests the user terminal 1000 to generate a certificate for identifying a history in which the agent 100 is previously executed, and receives a public key of the certificate generated by the user terminal 1000 (S1420).

At this time, the certificate generated by the user terminal 1000 includes a private key and a public key, wherein the private key is stored in a secure element 500 of the user terminal 100 and the public key is stored in the banking business management server 2000.

Next, the agent 100 sets login information for allowing the user to access the agent 100 by interacting with the banking business management server 2000.

In detail, the agent 100 may set a login means that includes at least one of pattern information and biometric information (S1430). At this time, the pattern information is to which keys on a keypad of the user terminal 1000 are connected and the biometric information may include fingerprint or iris.

Additionally, the agent 100 may set a PIN number used by the user as an authentication means for processing a banking business through the agent 100 (S1440).

If the login information is completely set through the above steps S1430 and S1440, the banking business management server 2000 generates a token key for identifying whether the login information has been set (S1450), and the agent 100 receives the token key generated by the banking business management server 2000 and transmits the received token key to the user terminal 1000, whereby the token key may be stored in the hardware secure element 500 of the user terminal 1000.

Next, the agent 100 opens an account in accordance with the user's request by interacting with the banking business management server 2000 (S1460).

In this way, in the embodiment of the present disclosure, the agent 100 may respectively manage the certificate for identifying the history in which the agent 100 has been previously executed and the token key for identifying whether the login information has been set, whereby the user may identify the step of executing the agent 100.

Hereinafter, the driving method of the agent according to the embodiment of the present disclosure to display a page suitable for a user based on identification of a certificate and a token key will be described with reference to FIG. 17.

Figure 17:
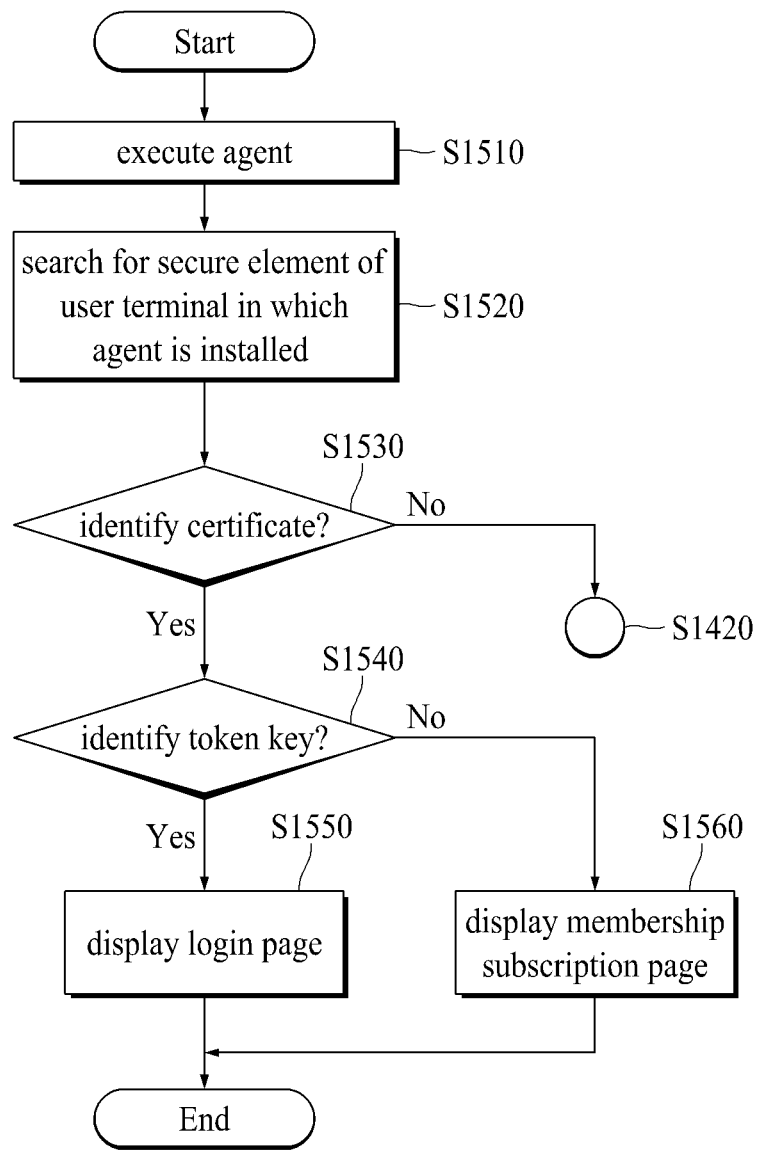
FIG. 17 is a flow chart briefly illustrating a method for driving a banking business processing application to display a page suitable for a user in accordance with one embodiment of the present disclosure.

As shown in FIG. 17, if the agent 100 is executed (S1510), the secure element 500 of the user terminal 1000 in which the agent 100 is installed is searched (S1520).

Next, if the certificate is identified in the secure element 500 (S1530) and the token key is identified (S1540), the login page is displayed (S1550). That is, as described above, if the login information is set through interaction between the agent 100 and the banking business management server 2000, the banking business management server 2000 generates the token key. Therefore, if the certificate and the token key are identified, the agent 100 may display the login page to allow the user to perform login by using the set login information.

On the other hand, if the token key is not detected in the step S1540, since the corresponding user has no history in which login information has been set, the agent 100 may display an introduction page and a membership subscription page (S1560) to guide the user's membership subscription.

Also, if the certificate is not detected in the step S1530, since the corresponding user terminal 1000 has no history in which the agent 100 has been executed, the agent 100 requests the user terminal 1000 to generate the certificate and receives the certificate's public key (S1420 of FIG. 14). Next, the agent 100 may set the login information and open the account in accordance with the user's request by performing the steps subsequent to the step S1430 of FIG. 14.

In this way, in the embodiment of the present disclosure, the page suitable for the step of previously executing the agent 100 may be automatically provided to the user who uses the corresponding agent 100, depending on whether the certificate and the token key has been identified, whereby the user's convenience may be improved.

Hereinafter, the driving method of the agent according to the embodiment of the present disclosure to allow a user who has set login information to easily an agent will be described with reference to FIG. 18.

Figure 18:
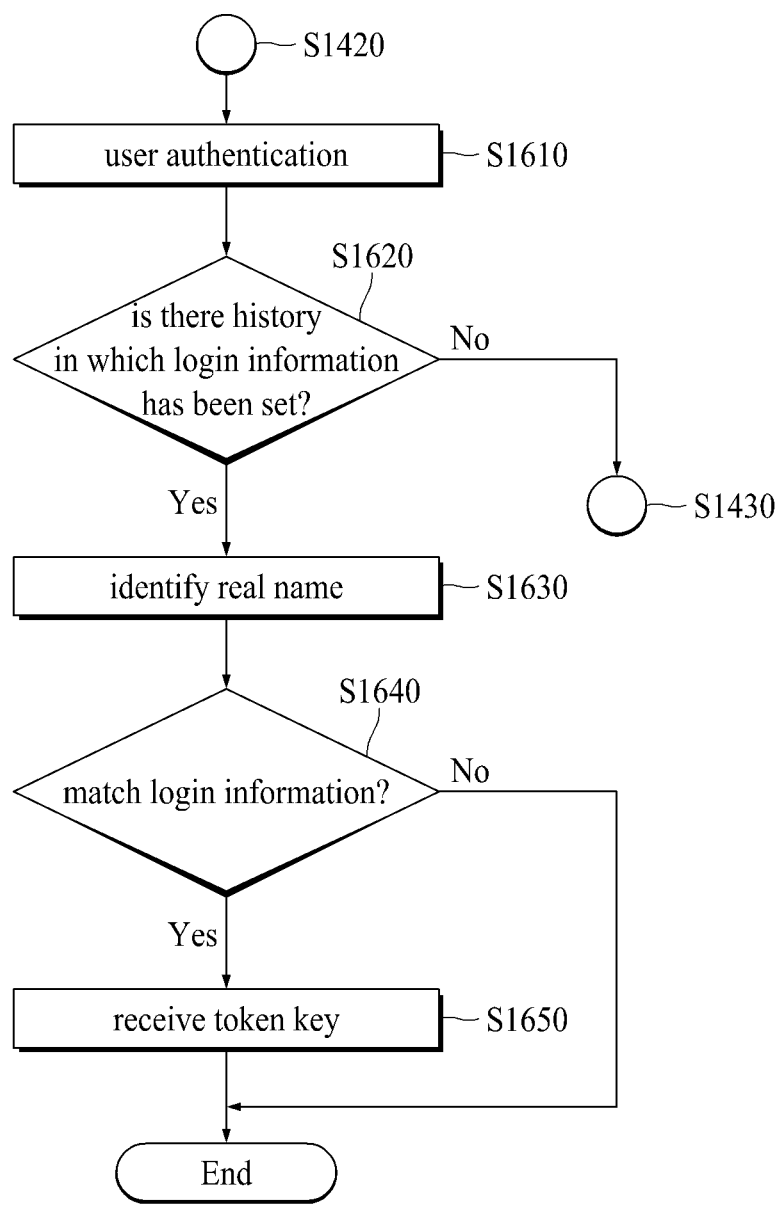
FIG. 18 is a flow chart briefly illustrating a method for driving a banking business processing application to allow a user who has set login information to easily use a banking business processing application in accordance with one embodiment of the present disclosure.

As shown in FIG. 18, if the certificate is not identified as a result of detection of the secure element 500 in accordance with execution of the agent 100, the agent 100 receives a public key of the certificate by requesting the user terminal 1000 to generate the certificate (S1420). That is, if the certificate is not identified in the secure element 500, since the corresponding user terminal 1000 has no history in which the agent 100 has been executed, the agent 100 requests the user terminal 1000 to generate a new certificate.

Next, the agent 100 performs user authentication to allow the corresponding user to subscribe membership (S1610). For example, the agent 100 may receive information for user authentication by providing an intro page, and may authenticate the user based on the received information for user authentication. For example, the agent 100 may authenticate the user by using a mobile phone number.

Next, if it is determined that the corresponding user has a history in which login information has been set, based on the result of user authentication (S1620), the agent identifies the corresponding user's real name (S1630), and determines whether the set login information is matched with login information by receiving the set login information (S1640). In the step S1630, the agent 100 may identify the user's real name by receiving ID card from the corresponding user, but the present disclosure is not limited thereto.

If the login information input by the user in the step S1640 is matched with the login information set in the steps S1420 and S2430, the agent 100 receives the token key from the banking business management server 2000 (S250), and transmits the corresponding token key to the user terminal 1000, whereby the token key is stored in the secure element 500. At this time, the agent 100 may receive the token key newly generated by the banking business management server 2000 but the present disclosure is not limited thereto. Therefore, the agent 100 may receive the token key previously used. That is, since the banking business management server 2000 manages the login information by matching the login information with the received public key and token key, the banking business management server 2000 may extract the token key matched with the login information input from the user and provide the extracted token key to the login unit 124.

On the other hand, if the login information input by the user in the step S1640 is not matched with the set login information, the agent 100 determines that the corresponding user is not a valid user who has set the login information, and terminates later steps, whereby the third party may be prevented from using the agent 100.

In this way, in the embodiment of the present disclosure, the user may identify whether the agent 100 has a history in which login information has been set in the process of user authentication, whereby the user may simply use the agent through a simplified authentication process even in the case that the agent 100 is re-installed or device change of the user terminal 1000 occurs. Also, since a real name identification process using an ID card is further performed in addition to the login information, the third party who has stolen login information of a valid user may be prevented from performing login to the agent of the user terminal 1000, whereby security capability may be improved.

It will be apparent to those skilled in the art that the present disclosure may be embodied in other specific forms without departing from the spirit and essential characteristics of the invention.

For example, the banking business processing application or agent according to the embodiments of the present disclosure may be a type recorded in a computer-readable recording medium or hardware device. The computer-readable recording medium or hardware device may include a program command, a data file, and a data structure solely or in combination. The computer-readable recording medium may be specially designed or configured for the present disclosure but may be used by being known to those skilled in the art of computer software.

Examples of the computer-readable recording medium include a magnetic medium such as a hard disk, a floppy disk and a magnetic tape, an optical recording medium such as CD-ROM and DVD, a magnetic-optical medium such as a floppy disk, and a hardware device such as a ROM, a RAM and a flash memory, which are specially configured to store and perform a program command. Examples of the program command include a machine language code generated by a compiler and an advanced language code that may be executed by a computer using an interpreter, etc.

Also, various functions performed by the banking business processing application or agent, for example, functions performed by the login unit, the certificate identifier and the token key identifier, which are included in the access management device, functions performed by the customer information file generation request device, functions performed by the product guide, the account information setting unit and the real name identifier, which are included in the account opening device, and functions performed by the payable interest information acquisition unit, the reference time computation unit, the real-time interest display unit and the real-time interest computation unit, which are included in the interest management device may be performed by a processor driven on the user terminal.

Thus, the above embodiments are to be considered in all respects as illustrative and not restrictive. The scope of the invention should be determined by reasonable interpretation of the appended claims and all change which comes within the equivalent scope of the invention are included in the scope of the invention.

What is claimed is:

1. A banking business processing method performed by a processing logic including a banking business processing application embodied on a user terminal and a computer-readable storage medium, the banking business processing method comprising the steps of:
searching, by the banking business processing application, a secure element of the user terminal for a certificate;
identifying a history based on the certificate, the history indicative that the banking business processing application has been previously executed by the user terminal;
when the existence of the certificate is not identified, requesting the user terminal to generate the certificate, and generating, by the user terminal, a private key and a public key in accordance with the requesting, wherein the certificate includes the private key and the public key, which are set to be matched with each other, the private key stored in the secure element using an application programming interface (API) provided by an operating system (OS), and the public key transmitted from the user terminal to a banking business management server and stored in the banking business management server, wherein the banking business management server is configured to generate the certificate by encrypting the public key and transfer the certificate to the user terminal, when existence of the certificate is identified, searching the secure element of the user terminal for a token key;

identifying that login information of a user has been set based on the token key;

displaying a specified type of page;

opening an account in accordance with a request of the user that set the login information, wherein the specified type of page is automatically determined depending on identifying existence of the token key and a membership subscription history, wherein displaying the specified type of page comprises:

when existence of the token key is identified, displaying a login page to which the set login information may be input;

when existence of the token key is not identified, identifying the membership subscription history;

when existence of the token key is not identified and the membership subscription history is not identified, displaying a membership subscription page for setting the login information of the user; and when existence of the token key is not identified and the membership subscription history is identified, determining that the user terminal is changed or the banking business processing application is reinstalled and displaying a device change page different from the membership subscription page;

wherein opening the account includes:

identifying truth of a captured image of a user's identification (ID) card; and authenticating other bank account information of the user, wherein authenticating the other bank account information is performed in parallel with identifying truth of the captured image of the user's ID card and is performed regardless of whether truth of the captured image of the user's ID card is positively identified;

wherein authenticating the other bank account information includes:

receiving the other bank account information from the user; and performing secondary real name identification for the user using the received other bank account information, and wherein the account is completely opened when the primary real name identification and the secondary real name identification based on a result of the truth identification are completed.

2. The banking business processing method of claim 1, further comprising the step of generating the token key for identifying whether the login information has been set, after the login information is set.

3. The banking business processing method of claim 2, wherein the login information includes at least one of biometric information including at least one of fingerprint, face and iris, pattern information to which keys on a keypad of the user terminal are connected, and PIN number as an authentication means for processing a banking business, and the token key is generated when the login information is set.

4. The banking business processing method of claim 1, further comprising the step of guiding, to the user, that an account opening application has been completed when the secondary real name identification based on the other bank account information is completed, after the step of performing the secondary real name identification, and further comprising the step of guiding, to the user, that account opening is not available when the primary real name identification is not completed in accordance with the result of the truth identification, after the step of receiving the result of the truth identification.

5. The banking business processing method of claim 1, further comprising the step of extracting reference information from the ID card image, wherein the reference information is transmitted to an external entity to request truth identification of the ID card.

6. The banking business processing method of claim 5, wherein the step of extracting the reference information includes the step of receiving correction information for the reference information from the user, wherein correction of the reference information is permitted for at least one of a case that a ratio of the correction information to the extracted reference information or previously collected customer information is within a predetermined range and a case that the correction information corresponds to preset error information for the extracted reference information or the previously collected customer information, wherein the error information is information in which text or number expected to be extracted in error is matched with text or number included in specific reference information.

7. The banking business processing method of claim 1, wherein the step of opening the account further includes:

sequentially displaying account opening pages for receiving information required for account opening; and sequentially storing pages completely input by the user, and if the banking business processing application is re-executed after being terminated before the account is completely opened, next page of the completely input page is displayed to allow the user to subsequently perform account opening.

8. A non-transitory computer-readable storage medium configured to store a banking business processing application to allow a banking business processing method to be performed by a processor of a user terminal, the banking business processing method comprising the steps of:

searching, by the banking business processing application, a secure element of the user terminal for a certificate;

identifying a history based on the certificate, the history indicative that the banking business processing application has been previously executed by the user terminal;

when the existence of the certificate is not identified, requesting the user terminal to generate the certificate, and generating, by the user terminal, a private key and a public key in accordance with the requesting, wherein the certificate includes the private key and the public key, which are set to be matched with each other, the private key stored in the secure element using an application programming interface (API) provided by an operating system (OS), and the public key transmitted from the user terminal to a banking business management server and stored in the banking business management server, wherein the banking business management server is configured to generate the certificate by encrypting the public key and transfer the certificate to the user terminal, when existence of the certificate is identified, searching the secure element of the user terminal for a token key;

identifying that login information of a user has been set based on the token key; and displaying a specified type of page;

opening an account in accordance with a request of the user who has set the login information, wherein the specified type of page is automatically determined depending on identifying existence of the token key and a membership subscription history, wherein displaying the specified type of page comprises:

when existence of the token key is identified, displaying a login page to which the set login information may be input;

when existence of the token key is not identified, identifying the membership subscription history;

when existence of the token key is not identified and the membership subscription history is not identified, displaying a membership subscription page for setting the login information of the user; and when existence of the token key is not identified and the membership subscription history is identified, determining that the user terminal is changed or the banking business processing application is reinstalled and displaying a device change page different from the membership subscription page; and wherein opening the account includes:

identifying truth of a captured image of a user's identification (ID) card; and certifying other bank account information of the user, wherein certifying the other bank account information is performed in parallel with identifying truth of the captured image of the user's ID card and is performed regardless of whether truth of the captured image of the user's ID card is positively identified;

wherein certifying the other bank account information includes:

receiving the other bank account information from the user; and performing secondary real name identification for the user using the received other bank account information, wherein the account is completely opened when the primary real name identification and the secondary real name identification based on a result of the truth identification are completed.

9. The non-transitory computer-readable storage medium, in which the banking business processing application is stored, of claim 8, wherein the banking business processing method further comprises the step of generating the token key for identifying whether the login information has been set, after the login information is set.

10. The non-transitory computer-readable storage medium, in which the banking business processing application is stored, of claim 8, wherein the banking business processing method further comprises the step of guiding, to the user, that an account opening application has been completed when the secondary real name identification based on the other bank account information is completed, after the step of performing the secondary real name identification, and further comprises the step of guiding, to the user, that account opening is not available when the primary real name identification is not completed in accordance with the result of the truth identification, after the step of receiving the result of the truth identification.

11. The non-transitory computer-readable storage medium, in which the banking business processing application is stored, of claim 8, wherein the banking business processing method further comprises the step of extracting reference information from the ID card image, and wherein the reference information is transmitted to an external entity to request truth identification of the ID card.

12. The non-transitory computer-readable storage medium, in which the banking business processing application is stored, of claim 11, wherein the step of extracting the reference information includes the step of receiving correction information for the reference information from the user, wherein correction of the reference information is permitted for at least one of a case that a ratio of the correction information to the extracted reference information or previously collected customer information is within a predetermined range and a case that the correction information corresponds to preset error information for the extracted reference information or the previously collected customer information, and wherein the error information is information in which text or number expected to be extracted in error is matched with text or number included in specific reference information.

13. The non-transitory computer-readable storage medium, in which the banking business processing application is stored, of claim 8, wherein the step of opening the account further includes:

sequentially displaying account opening pages for receiving information required for account opening; and sequentially storing pages completely input by the user, and if the banking business processing application is re-executed after being terminated before the account is completely opened, next page of the completely input page is displayed to allow the user to subsequently perform account opening.

* * * * *